United States Patent [19]
Ajisaka et al.

[11] Patent Number: 6,164,712
[45] Date of Patent: Dec. 26, 2000

[54] SEAT STRUCTURE FOR VEHICLE

[75] Inventors: Satoshi Ajisaka; Masatoshi Mori, both of Aichi-ken, Japan

[73] Assignees: Toyota Jidosha Kabushiki Kaisha, Toyota; Aisin Seiki Kabushiki Kaisha, Kariya, both of Japan

[21] Appl. No.: 09/220,367

[22] Filed: Dec. 24, 1998

[30] Foreign Application Priority Data

Dec. 26, 1997 [JP] Japan .................................. 9-359398

[51] Int. Cl.⁷ ......................................................... B60N 2/04
[52] U.S. Cl. ................................. 296/65.03; 297/378.12
[58] Field of Search ..................... 296/65.03; 297/378.12, 297/335, 334, 336, 354.12, 361.1, 331; 248/503.1

[56] References Cited

U.S. PATENT DOCUMENTS

| | | |
|---|---|---|
| 4,865,377 | 9/1989 | Musser et al. . |
| 5,238,285 | 8/1993 | Holdampf et al. .................... 296/65.03 |
| 5,330,245 | 7/1994 | Boisset . |
| 5,364,152 | 11/1994 | Mastrangelo et al. ............... 296/65.03 |
| 5,372,398 | 12/1994 | Ameiros et al. ...................... 296/65.03 |
| 5,482,345 | 1/1996 | Bolsworth et al. . |
| 5,547,242 | 8/1996 | Dukatz et al. ........................ 296/65.03 |
| 5,562,322 | 10/1996 | Christoffel ............................ 296/65.03 |
| 5,775,763 | 7/1998 | Glinter et al. ........................ 296/65.03 |
| 6,024,411 | 2/2000 | Pesta et al. ..................... 297/378.12 X |
| 6,036,252 | 3/2000 | Hecksel et al. ....................... 296/65.03 |
| 6,039,401 | 3/2000 | Rus ................................. 296/65.03 X |

FOREIGN PATENT DOCUMENTS

| | | |
|---|---|---|
| 42 04 712 | 8/1992 | Germany . |
| 63-137054 | 6/1988 | Japan . |
| 1-141138 | 9/1989 | Japan . |

*Primary Examiner*—Joseph D. Pape
*Attorney, Agent, or Firm*—Burns, Doane, Swecker & Mathis, LLP

[57] ABSTRACT

A lock mechanism which is capable of selecting a locked state or an unlocked state with respect to a seat fixing member is disposed on a rear leg portion of a seat. A hook portion is formed at each of a front portion and a rear portion of an opening portion of a notch formed in a front leg portion of the seat. A projection of a base hook which is swingably connected to the front leg portion is engageable with an engaging projection of a cam that is swingably connected to the front leg portion. The cam is engaged with a spring for urging the cam in a direction in which the engaging projection engages with the projection. Due to a hook portion of the front leg portion passing beneath a pin which is disposed in a rail and which has reached a bottom of a groove in the base hook, the seat and the pin are prevented from becoming disengaged from each other. Hence, a seat structure for a vehicle is provided which reduces the weight of the seat and improves operating efficiency with respect to changing the position of the seat relative to a vehicle body.

20 Claims, 21 Drawing Sheets

F I G. 8
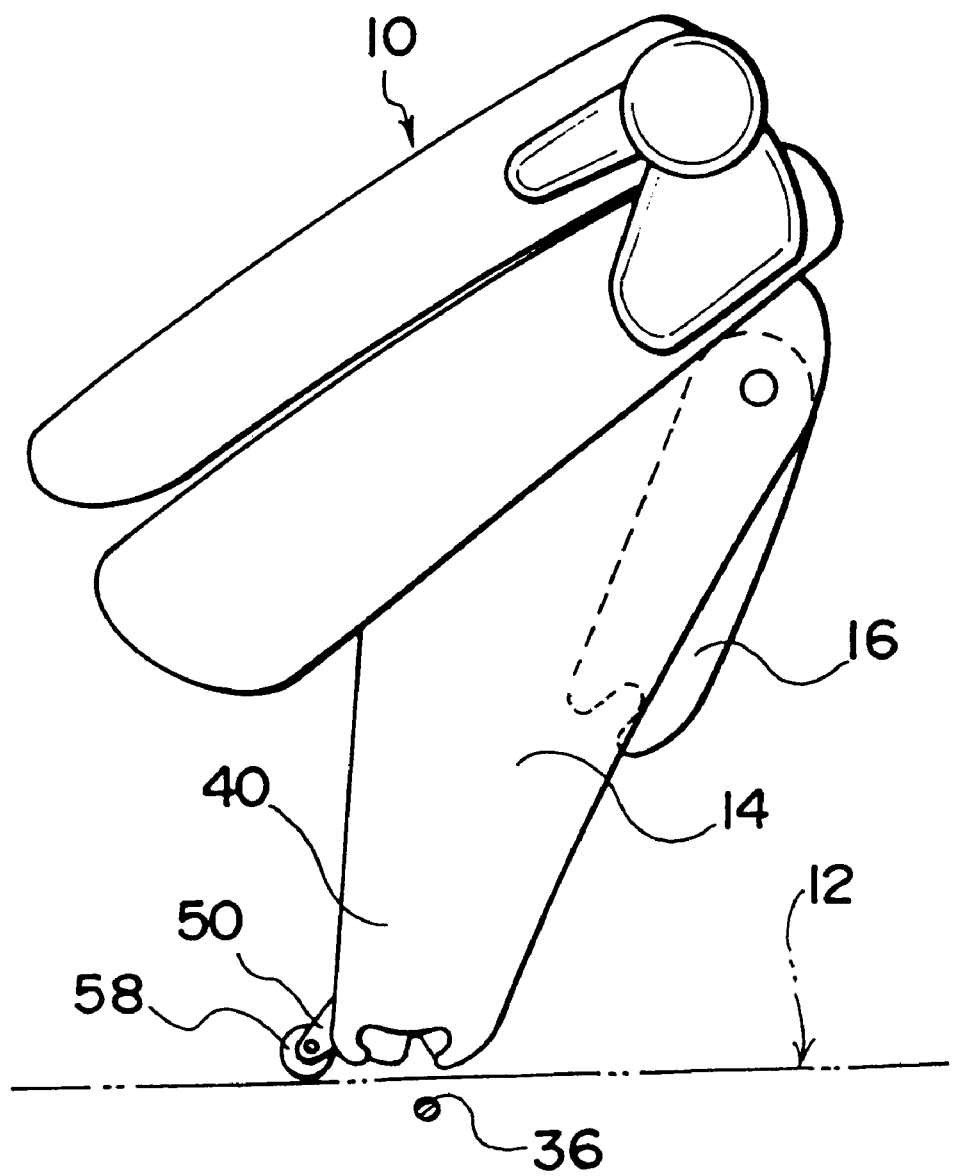

SEAT STRUCTURE FOR VEHICLE

BACKGROUND OF THE INVENTION

1. Field of the Invention

The present invention relates to a seat structure for a vehicle, and more particularly to a seat structure for a vehicle which is attachable and detachable with respect to a floor.

2. Description of the Related Art

Conventionally, in a seat structure for a vehicle such as an automobile, a seat for a vehicle which is attachable and detachable with respect to a floor is known, and an example of such a seat is disclosed in Japanese Patent Application Laid-Open (JP-A) No. 63-137054.

As shown in FIG. 20, in this seat structure for a vehicle, by rotationally operating an operation lever 102 provided in a lower side portion in the rear of a seat 100 for a vehicle, the rotation of a shaft 102A shown in FIG. 21 is transmitted to a front lock mechanism 104 by means of a connecting rod 103. As a result, a front lock plate 106 of the front lock mechanism 104 is rotated in an unlocking direction (in the direction of arrow X in FIG. 21), thereby canceling its retention by a front floor pin 108 disposed on the vehicle body side. In addition, if the shaft 102A rotates, a support lever 110 rotates in an unlocking direction (in the direction of arrow Y in FIG. 21), which in turn reverses the state of engagement between a rear lock plate 114 of a rear lock mechanism 112 and an engaging portion 110A of the support lever 110, so that the retention of the rear lock plate 114 by a rear floor pin 118 disposed on the vehicle body side can be canceled by a spring 116.

Further, if the operation lever 102 is rotationally operated, the seat 100 for a vehicle shown in FIG. 20 starts to rotate upward about the front floor pin 108, thereby allowing the seat 100 for a vehicle to be easily detached from the floor.

However, with this seat structure for a vehicle, the front lock mechanism 104 and the shaft 102A of the operation lever 102 provided in the lower side portion in the rear of the seat 100 for a vehicle are connected to each other by the elongated connecting rod 103 extending in the longitudinal direction of the seat. As a result, the apparatus is made complex and the weight of the seat is made heavy.

SUMMARY OF THE INVENTION

In view of the above-described circumstances, it is an object of the present invention to provide a seat structure for a vehicle which is capable of reducing the weight of a seat and improving operating efficiency in changing a position of the seat relative to a vehicle body.

To this end, in accordance with a first aspect of the present invention, there is provided a seat structure for a vehicle comprising: seat fixing members disposed at a vehicle body side; a lock mechanism disposed at one of a front side and a rear side of a lower portion of a seat and capable of selecting a locked state or an unlocked state with respect to the seat fixing members; a leg portion provided at another one of the front side and the rear side of the lower portion of the seat and swingable in a back-and-forth direction with respect to the seat fixing members; an engaging member swingably supported by the leg portion and having an engaging groove for engaging with the seat fixing members; a lock controlling portion formed in the leg portion and movable to a locking position in which the engaging member is set in a locked state with respect to the seat fixing member and an unlocking position in which the engaging member is made detachable with respect to the seat fixing member as the leg portion swings; and swinging-motion restricting means swingably supported by the leg portion so as to restrict the swinging motion of the engaging member and the leg portion.

Accordingly, when the seat is fixed, the lock mechanism is in a state of being locked to the seat fixing member disposed on the vehicle body side, and the lock controlling portion formed in the leg portion maintains the engaging member in the locked state in the engaging groove with respect to the seat fixing member.

Meanwhile, at the time of detaching the seat, if the leg portion together with the seat is swung, the leg portion is swung with respect to the engaging member, and the lock controlling portion formed in the leg portion moves to the unlocking position at which the engaging member in the engaging groove is made detachable from the seat fixing member. The engaging member and the swinging-motion restricting means engage with each other, thereby restricting the swinging motion of the engaging member and the leg portion.

In addition, at the time of setting the seat in a tumbled state, the engagement between the engaging member and the swinging-motion restricting means is canceled, and the leg portion together with the seat is further swung. Consequently, the leg portion is swung with respect to the engaging member, and the lock controlling portion formed in the leg portion maintains the engaging member in the locked state in the engaging groove with respect to the seat fixing member.

Accordingly, since a connecting rod extending along the back-and-forth direction of the seat as in the conventional structure is not used, an outstanding advantage is offered in that it is possible to reduce the weight of the seat and improve the operating efficiency in changing the position of the seat relative to the vehicle body.

In accordance with a second aspect of the present invention, in the seat structure for a vehicle according to the first aspect of the invention, the lock controlling portion is a notch extending in a circular arc-shape along a direction in which the leg portion swings, and a pair of hook portions for holding the seat fixing member in the locked state are respectively formed at opposite end portions of an opening portion of the notch.

Accordingly, in addition to the arrangement in accordance with the first aspect of the invention, when the seat is fixed, the lock mechanism is in the locked state with respect to the seat fixing member disposed on the vehicle body side, and one of the hooks formed at opposite end portions of the opening portion of the notch formed in the leg portion and extending in the circular arc-shape along the swinging direction of the leg portion holds the engaging member in the locked state in the engaging groove with respect to the seat fixing member.

Further, at the time of detaching the seat, the leg portion together with the seat is swung, and the opening portion of the notch formed in the leg portion is aligned with the engaging groove formed in the engaging member, making the engaging member disengageable from the seat fixing member in the engaging groove.

In addition, at the time of setting the seat in the tumbled state, the engagement between the engaging member and the swinging-motion restricting means is canceled, and the leg portion together with the seat is further swung. Consequently, the leg portion is swung with respect to the engaging member, and the other one of the hooks formed at the opposite end portions of the opening portion of the notch formed in the leg portion and extending in the circular arc-shape along the swinging direction of the leg portion holds the engaging member in the locked state in the engaging groove with respect to the seat fixing member.

Therefore, in accordance with the second aspect of the present invention, in addition to the advantage of the first aspect of the invention, an outstanding advantage is offered in that the arrangement is made simple, and lower cost can be attained.

In accordance with a third aspect of the present invention, the seat structure for a vehicle according to the first or second aspect of the invention further comprises: moving means which is provided at the engaging member and whose point of contact with the vehicle body serves as a center of the swinging motion of the leg portion when the swinging motion of the engaging member and the leg member is restricted by the swinging-motion restricting means, the moving means being used for moving the seat in a predetermined direction with respect to the vehicle body.

Accordingly, in addition to the arrangement in accordance with the first or second aspect of the invention, at the time of moving the seat in the predetermined direction relative to the vehicle body, if the seat is further swung in the unlocked state, the swinging motion of the engaging member and the leg portion is restricted by the swinging-motion restricting means, so that the leg portion and the seat are swung about a point of contact between the moving means and the vehicle body, thereby allowing the engagement between the engaging portion and the seat fixing member to be completely canceled. In this state, the seat can be easily moved in the predetermined direction relative to the vehicle body.

Therefore, in accordance with the third aspect of the present invention, in addition to the advantage of the first or second aspect of the invention, an outstanding advantage is offered in that the seat can be moved smoothly.

BRIEF DESCRIPTION OF THE DRAWINGS

FIG. 8 is a side view illustrating the seat movable state of the seat structure for a vehicle in accordance with the first embodiment of the present invention;

DESCRIPTION OF THE PREFERRED EMBODIMENTS

Figure 1:
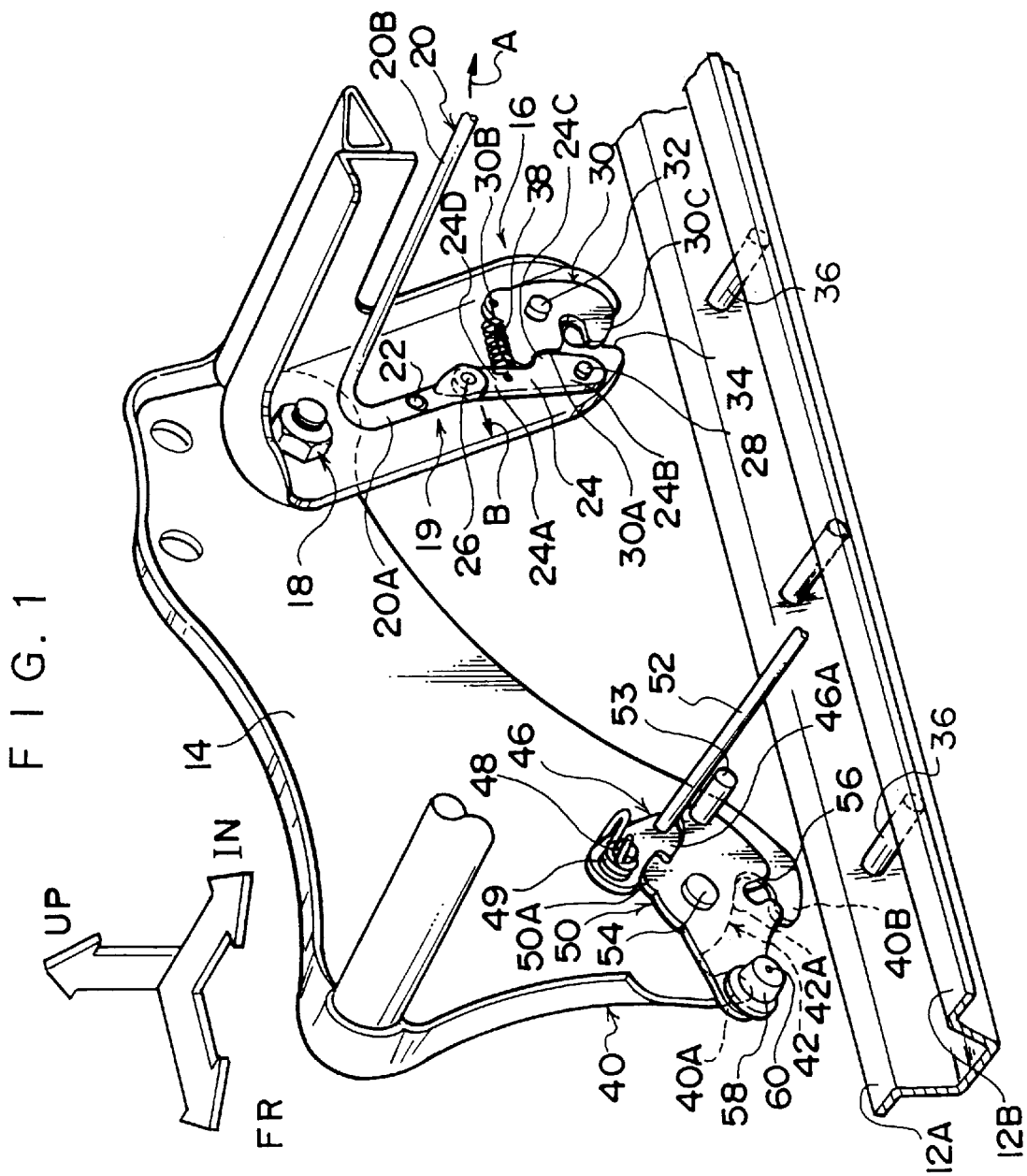
FIG. 1 is a perspective view taken from the forward inner side of the vehicle and illustrating essential portions of a seat structure for a vehicle in accordance with a first embodiment of the present invention.

Referring now to FIGS. 1 to 9, a description will be given of a first embodiment of the seat structure for a vehicle in accordance with the present invention. It should be noted that, in the drawings, arrow FR indicates a forward direction of the vehicle, arrow UP indicates an upward direction of the vehicle, and arrow IN indicates a transversely inward direction of the vehicle.

Figure 6:
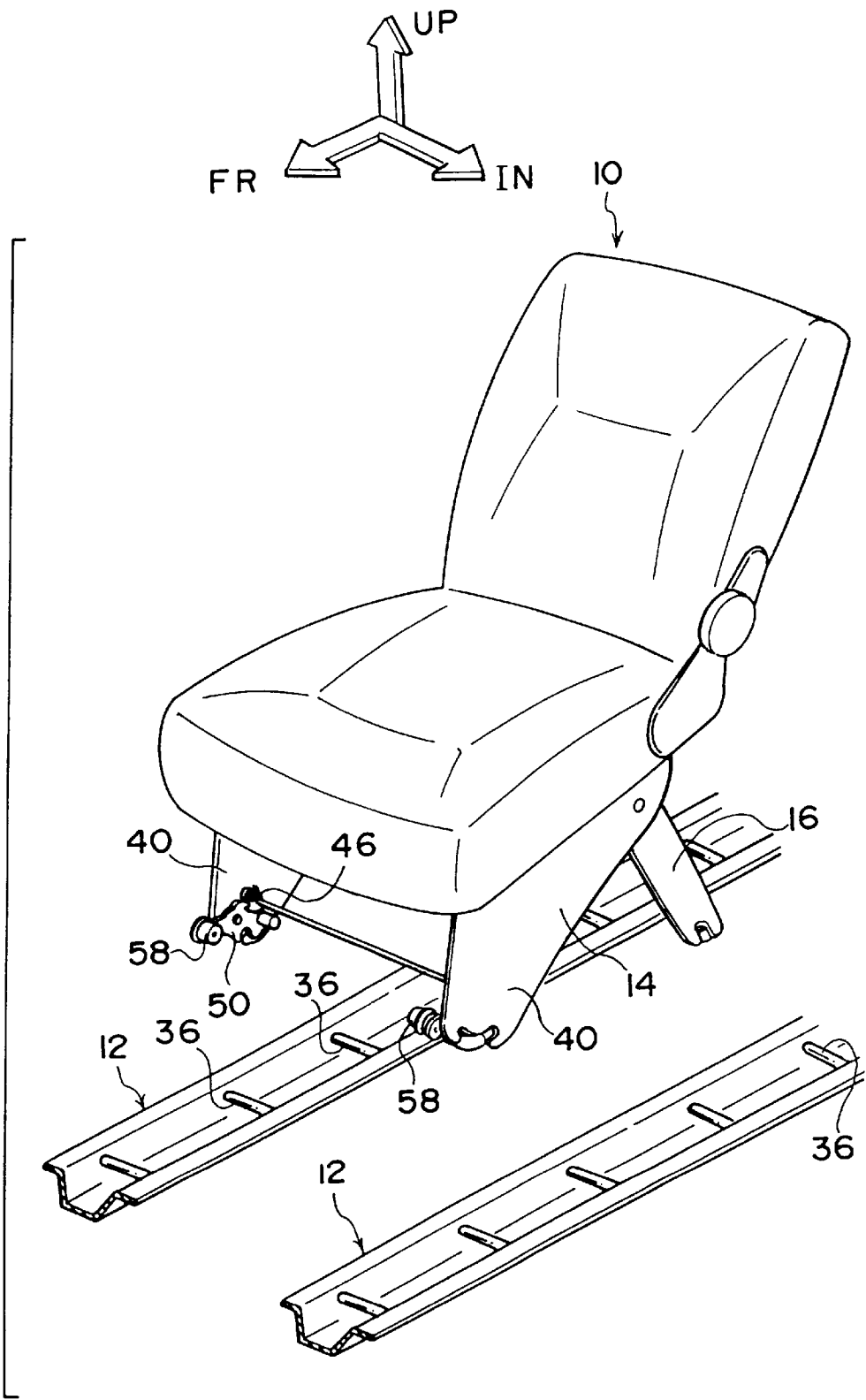
FIG. 6 is a perspective view taken from the forward inner side of the vehicle and illustrating the seat structure for a vehicle in accordance with the first embodiment of the present invention.
Figure 7:
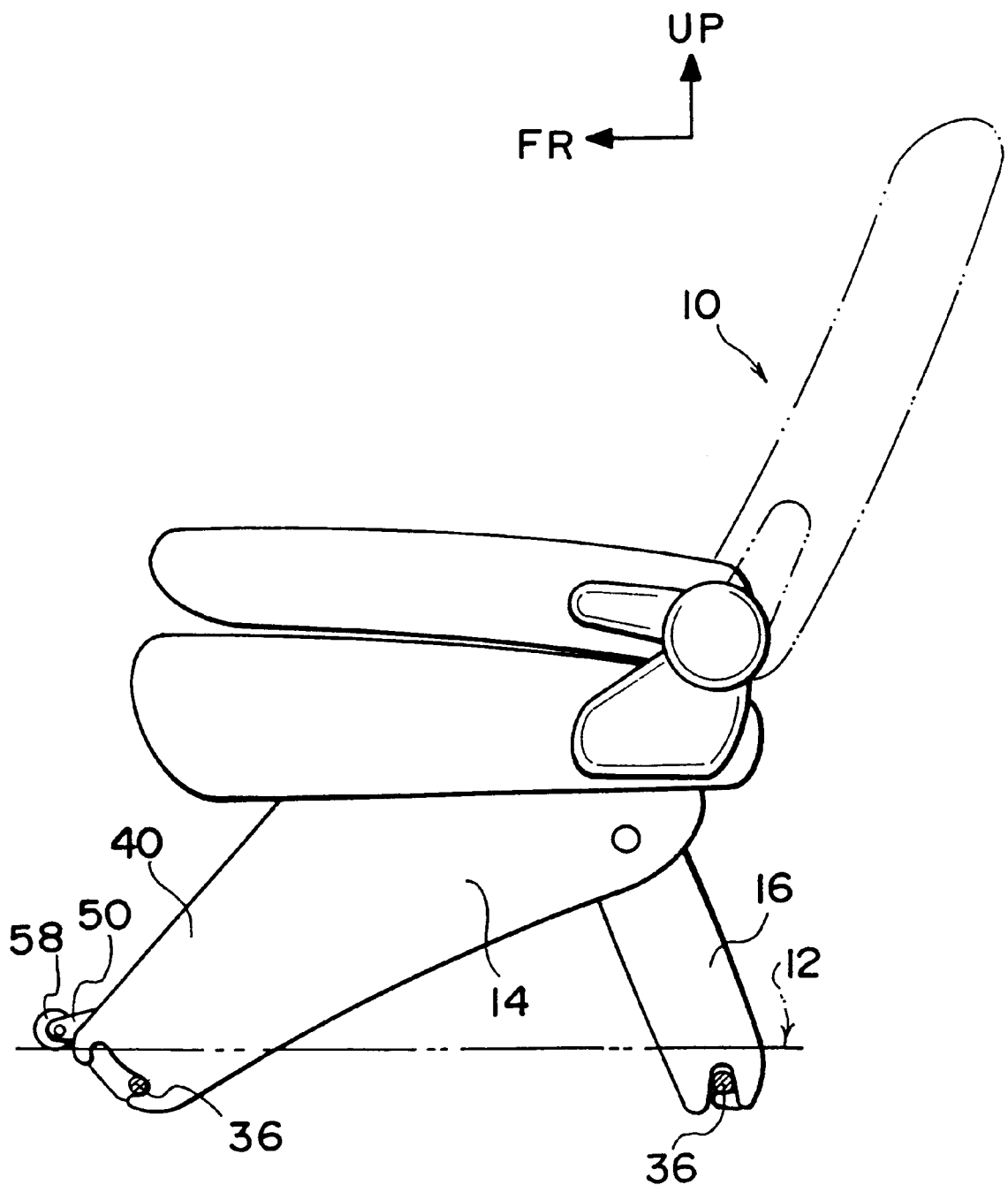
FIG. 7 is a side view illustrating the seat usable state of the seat structure for a vehicle in accordance with the first embodiment of the present invention.

As shown in FIG. 6, in the seat structure for a vehicle in this embodiment, a rear seat 10 of an automobile is movable in the longitudinal direction of the vehicle along a pair of rails 12 which are laid on the floor of the vehicle body in the longitudinal direction of the vehicle. Pins 36 serving as seat fixing members are arranged within each rail 12 in such a manner as to be spaced apart at predetermined intervals in the longitudinal direction of the vehicle and to be respectively oriented in the transverse direction of the vehicle.

As shown in FIG. 1, a rear leg portion 16 is attached to a rear portion of each of a pair of side wall portions 14 (only the right-hand side wall portion 14 is shown in FIG. 1) of a seat cushion frame by a connecting means 18 such as a bolt and a nut in such a manner as to be swingable in the back-and-forth direction. Each rear leg portion 16 can be folded in the inward direction of the respective side wall portions 14 of the seat cushion frame, as required.

Each of the left and right rear leg portions 16 is provided with a lock mechanism 19 which is capable of selecting a locked state (an undetachable state) and an unlocked state (a detachable state) with respect to the pins 36.

Next, a detailed description will be given of this lock mechanism 19.

A lever 20 is provided in such a manner as to extend between the left and right rear leg portions 16, and each opposite end portion 20A of the lever 20 is bent substantially orthogonally and extends along the inward side surface of the rear leg portion 16. An intermediate portion of each opposite end portion 20A of the lever 20 is pivotally supported by the rear leg portion 16 by means of a pin 22, so that the lever 20 is swingable about the pins 22 in a substantially rearward direction (in the direction of arrow A in FIG. 1) and in a substantially forward direction (in a direction opposite to the direction of arrow A in FIG. 1).

An upper end portion 24A of a cam 24 is swingably connected to each opposite end portion 20A of the lever 20 by means of a pin 26. A lower end portion 24B of the cam 24 is pivotally supported by the rear leg portion 16 by means of a pin 28, so that the cam 24 is swingable about the pin 28 in a substantially back-and-forth direction.

Accordingly, if an intermediate portion 20B of the lever 20 is operated in the direction of arrow A in FIG. 1, the cams 24 respectively connected to the opposite end portions 20A of the lever 20 are adapted to swing about the pins 28 in the substantially forward direction.

An engaging projection 24C is formed on a rear portion of the cam 24, and a recessed portion 30A of a ratchet 30 is engageable with the engaging projection 24C. The ratchet 30 at its substantially central portion is pivotally supported by the rear leg portion 16 by means of a pin 32, so that the ratchet 30 is swingable about the pin 32 in the substantially back-and-forth direction.

A U-shaped groove 34 is formed in a lower end portion of the rear leg portion 16, and the pin 36 provided in the rail 12 is adapted to be inserted in the groove 34. A hook portion 30C formed in a lower portion of the ratchet 30 is adapted to pass underneath the pin 36 which has reached the bottom of the groove 34, and to hold the rear leg portion 16 and the pin 36 in a locked state.

A coil spring 38 is provided between a spring-engaging portion 30B formed in an upper portion of the ratchet 30 and a spring-engaging portion 24D formed in an upper portion of the cam 24. For this reason, when the cam 24 is swung about the pin 28 in the substantially forward direction, and the engagement between the engaging projection 24C of the cam 24 and the recessed portion 30A of the ratchet 30 is canceled, the upper portion of the ratchet 30 is swung about the pin 32 in the substantially forward direction due to the tensile force of the coil spring 38. Hence, the hook portion 30C is swung in the substantially rearward direction, and the hook portion 30C and the pin 36 are set in an unlocked state, thereby allowing the rear leg portion 16 to be detachable from the pin 36.

Next, a description will be given of a front leg portion 40 formed on a front portion of each side wall portion 14 of the seat cushion frame.

The front leg portion 40 of the seat is formed on a front portion of each side wall portion 14 of the seat cushion frame in such a manner as to project in the downward direction of the seat, and a notch 42 serving as a lock controlling portion is formed in a lower end portion of the front leg portion 40. As compared with its opening portion, a bottom 42A of the notch 42 is enlarged in a substantially back-and-forth direction in a circular arc-shape with its lower portion being set as a projecting portion, and a pair of recessed portions for holding the pin 36 in the locked state are respectively formed at opposite end portions of the notch 42. Namely, a hook portion 40A and a hook portion 40B are respectively formed in a front portion and a rear portion of the opening portion of the notch 42.

Figure 2:
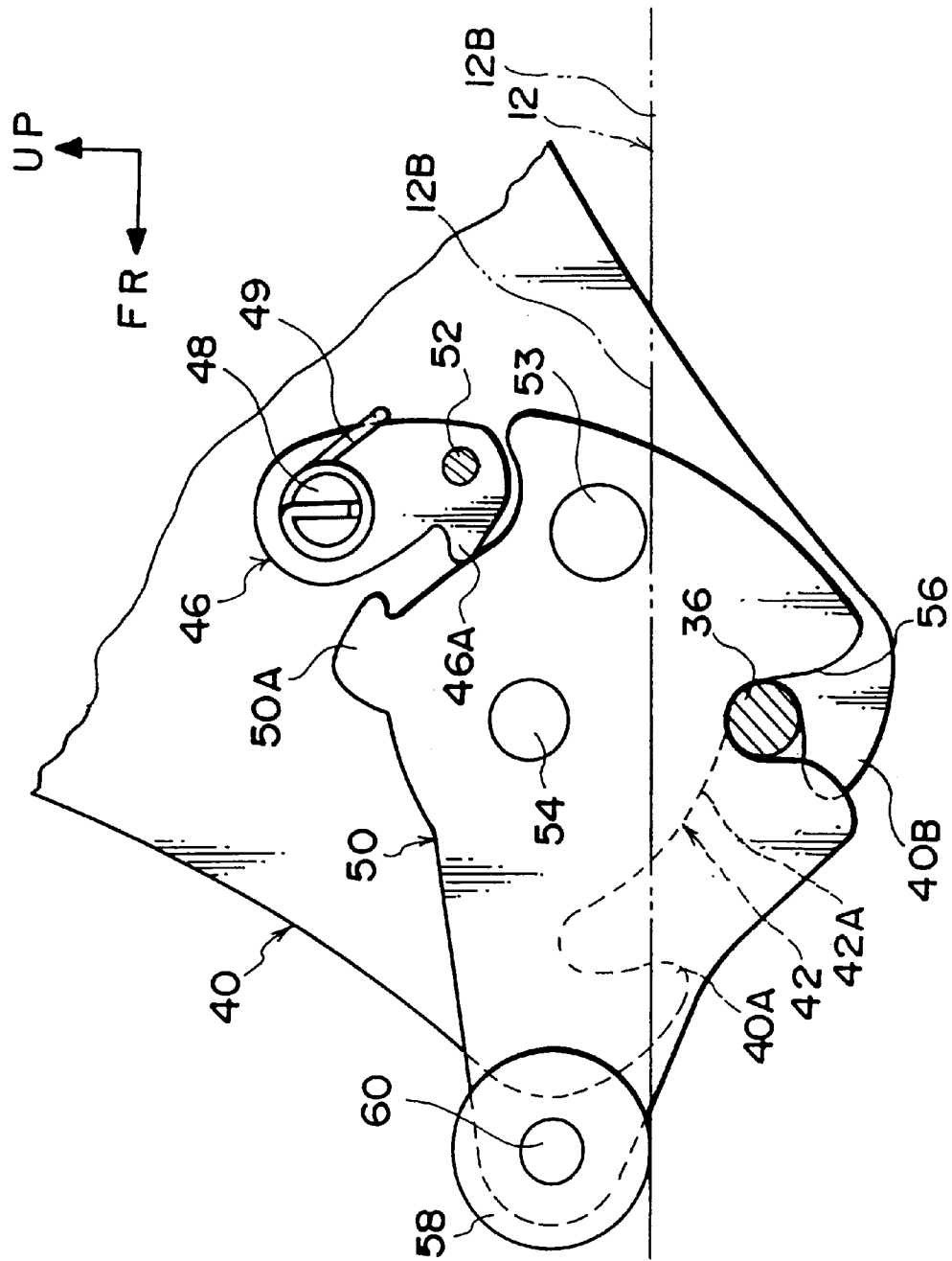
FIG. 2 is a side view illustrating a seat usable state of the essential portions of the seat structure for a vehicle in accordance with the first embodiment of the present invention.

An upper portion of a cam 46 serving as a swinging-motion restricting means is swingably connected to each front leg portion 40 by means of a pin 48. An engaging projection 46A is formed on the front side of a lower portion of the cam 46, and a projection 50A formed on the upper side of a rear portion of a base hook 50 serving as an engaging member is engageable with the engaging projection 46A. Further, a spring 49 wound around the pin 48 is engaged with the cam 46, and the spring 49 urges the cam 46 in a direction in which the engaging projection 46A is brought into contact with the base hook 50. Incidentally, lower portions of the left and right cams 46 are connected to each other by means of a lever 52. Further, a pin 53 is provided in an upright position on a rear end portion of the base hook 50, substantially parallel with the lever 52. The arrangement provided is such that, as shown in FIG. 2, as the pin 53 abuts on a flange portion 12B of the rail 12, the base hook 50 is prevented from falling into the rail 12, and the base hook 50 can be held in the locked position, shown in FIG. 2, with respect to the front leg portion 40.

A substantially central portion of the base hook 50 is pivotally supported by the front leg portion 40 by means of a pin 54, so that the base hook 50 is swingable about the pin 54 in the substantially back-and-forth direction. A U-shaped engaging groove 56 is formed in a lower portion of the base hook 50, and the pin 36 provided in the rail 12 is adapted to be inserted in this engaging groove 56. Accordingly, as either one of the hook portion 40A and the hook portion 40B of the front leg portion 40 passes underneath the pin 36 which has reached the bottom of the engaging groove 56, the seat 10 is prevented from being disengaged from the pin 36 (in the locked state).

A roller 58 serving as a moving means is supported by a front end portion of each base hook 50 by means of a shaft 60. It should be noted that the cross-sectional shape of the rail 12 as viewed in the longitudinal direction of the vehicle is hat-shaped with its opening facing upward. At the time of the movement of the seat 10, which will be described later, the roller 58 moves on a seat inner-side flange portion 12B between a flange portion 12A and the flange portion 12B provided at the opening of the rail 12.

Next, a description will be given of an operation in accordance with the present embodiment.

With the seat structure for a vehicle in accordance with the present embodiment, when the seat is in a usable state, i.e., when the seat cushion frame is in a state wherein an occupant can be seated, each of the rear leg portions 16 and the pins 36 are held in a locked state by means of the lock mechanism 19. At the same time, as shown in FIG. 2, the hook portion 40B of the front leg portion 40 has passed underneath one of the pins 36 which reached the bottom of the engaging groove 56 provided in the base hook 50 of the front leg portion 40, so that the front leg portion 40 and the pin 36 are in a locked state.

Meanwhile, when the seat 10 is moved, the intermediate portion 20B of the lever 20 of the lock mechanism 19 provided on the rear leg portion 16 is first operated in the substantially rearward direction (in the direction of arrow A in FIG. 1). This operation causes the opposite end portions 20A of the lever 20 to swing about the respective pins 22 in the substantially forward direction (in the direction of arrow B in FIG. 1), so that each cam 24 swings about the respective pin 28 in the substantially forward direction (in the direction of arrow B in FIG. 1). As a result, the engagement between the engaging projection 24C of the cam 24 and the recessed portion 30A of the ratchet 30 is canceled, and the upper portion of the ratchet 30 swings about the pin 32 in the substantially forward direction due to the tensile force of the coil spring 38, which in turn causes the hook portion 30C to swing in the substantially rearward direction, thereby allowing the hook portion 30C to be disengageable from the pins 36.

Figure 3:
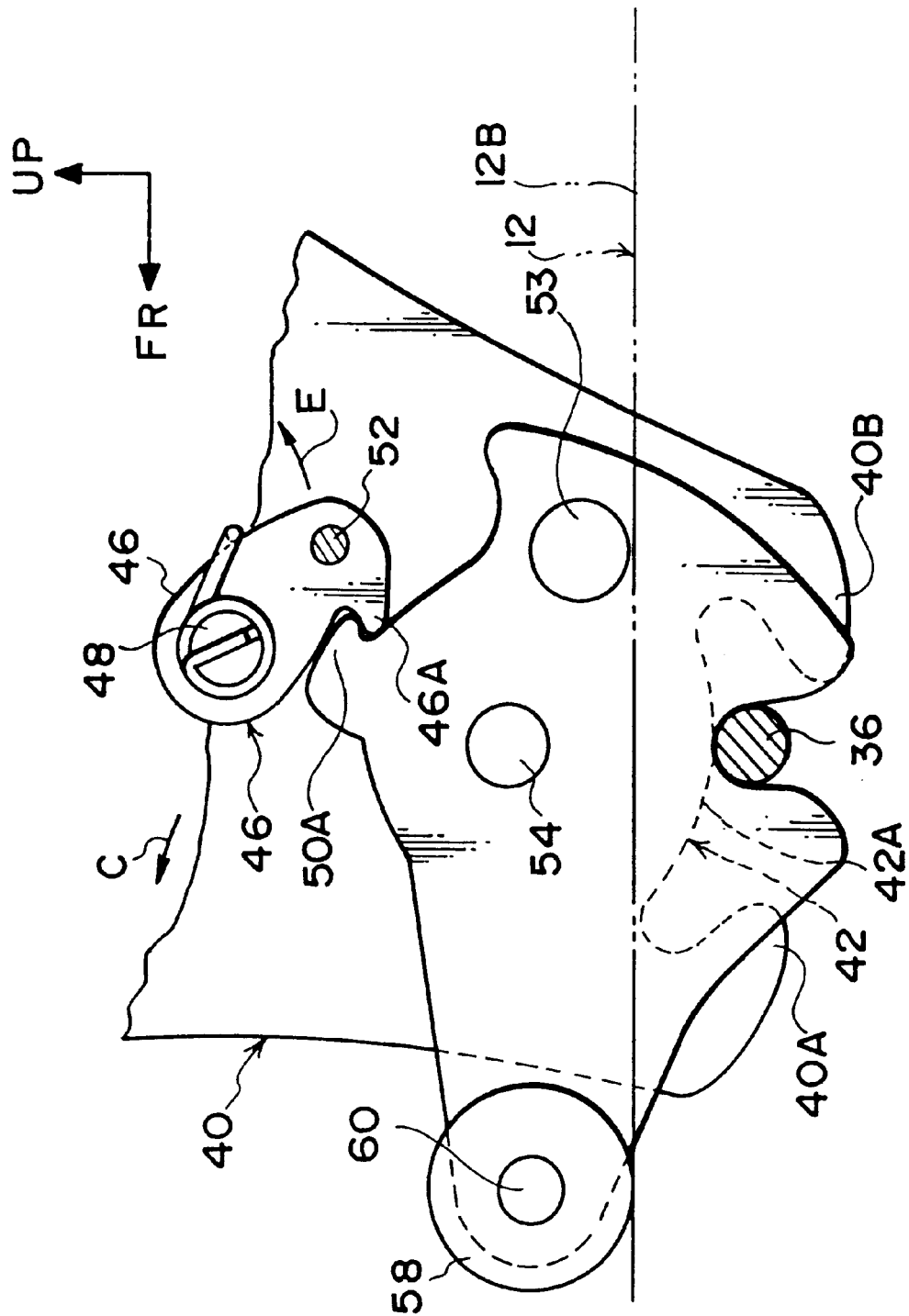
FIG. 3 is a side view illustrating a seat attachable/detachable state of the essential portions of the seat structure for a vehicle in accordance with the first embodiment of the present invention.

Next, if the rear portion of the seat 10 is pulled upward, as shown in FIG. 3, the bottom of the notch 42 slides on the pins 36, and the front leg portion 40 is swung in the direction of arrow C. As a result, the pin 36 moves to the opening portion of the notch 42, and the hook portion 40B of the front leg portion 40 come out from underneath the pins 36, so that the engagement between the engaging groove 56 provided in the base hook 50 and the pins 36 can be canceled.

Figure 4:
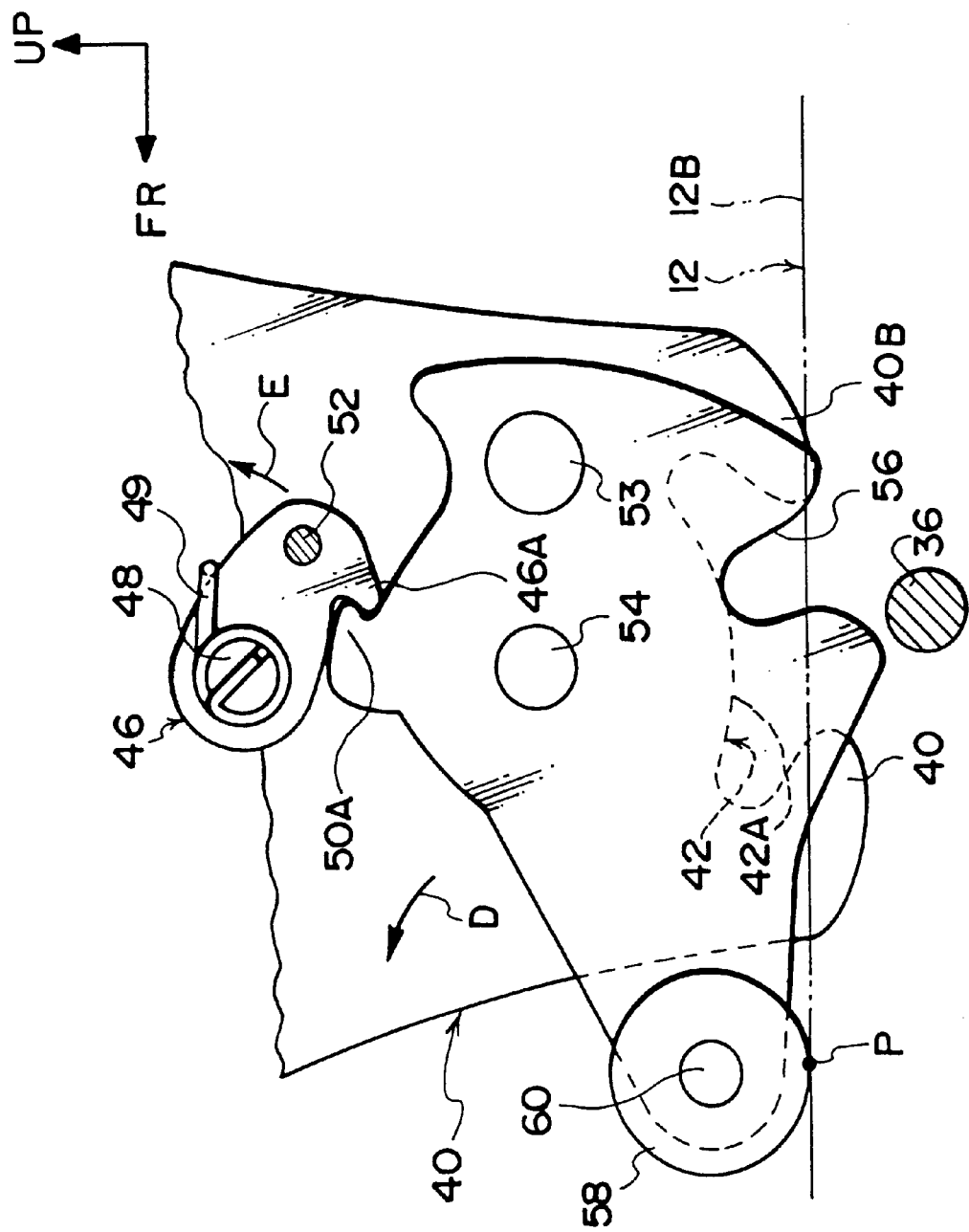
FIG. 4 is a side view illustrating a seat movable state of the essential portions of the seat structure for a vehicle in accordance with the first embodiment of the present invention.

Further, if the rear portion of the seat 10 is pulled more upward, as shown in FIG. 4, the engaging projection 46A of the cam 46 is engaged with the projection 50A of the base hook 50. As a result, the swinging motion of the front leg portion 40 and the base hook 50 is restricted, and the front leg portion 40 and the base hook 50 integrally rotate about a point of contact, P, between the roller 58 and the rail 12 in the direction of arrow D. Consequently, each pin 36 is disengaged from the engaging groove 56 provided in the base hook 50, and the engagement between the two members is canceled.

Accordingly, if the seat 10 is moved in the back-and-forth direction in this state, the roller 58 rolls on the rail 12, so that the seat 10 can be moved easily.

In addition, if the lever 52 is operated in the substantially rearward direction (in the direction of arrow E in FIGS. 3 and 4) in the state shown in FIGS. 3 and 4, the cam 46 is swung about the pin 48 in the direction of arrow E against the urging force of the spring 49, canceling the engagement between the engaging projection 46A of the cam 46 and the projection 50A of the base hook 50.

Figure 5:
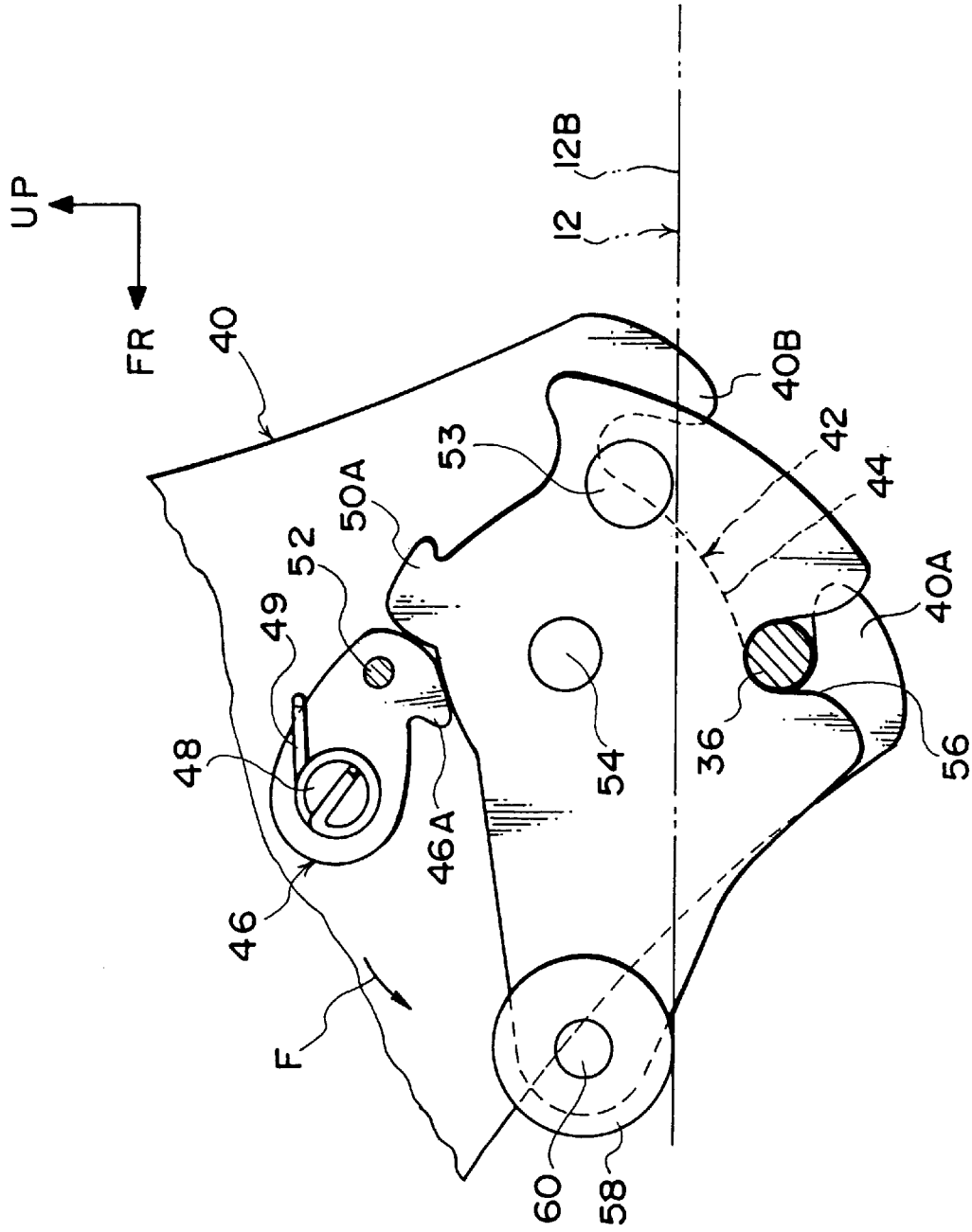
FIG. 5 is a side view illustrating a seat tumbled state of the essential portions of the seat structure for a vehicle in accordance with the first embodiment of the present invention.
Figure 9:
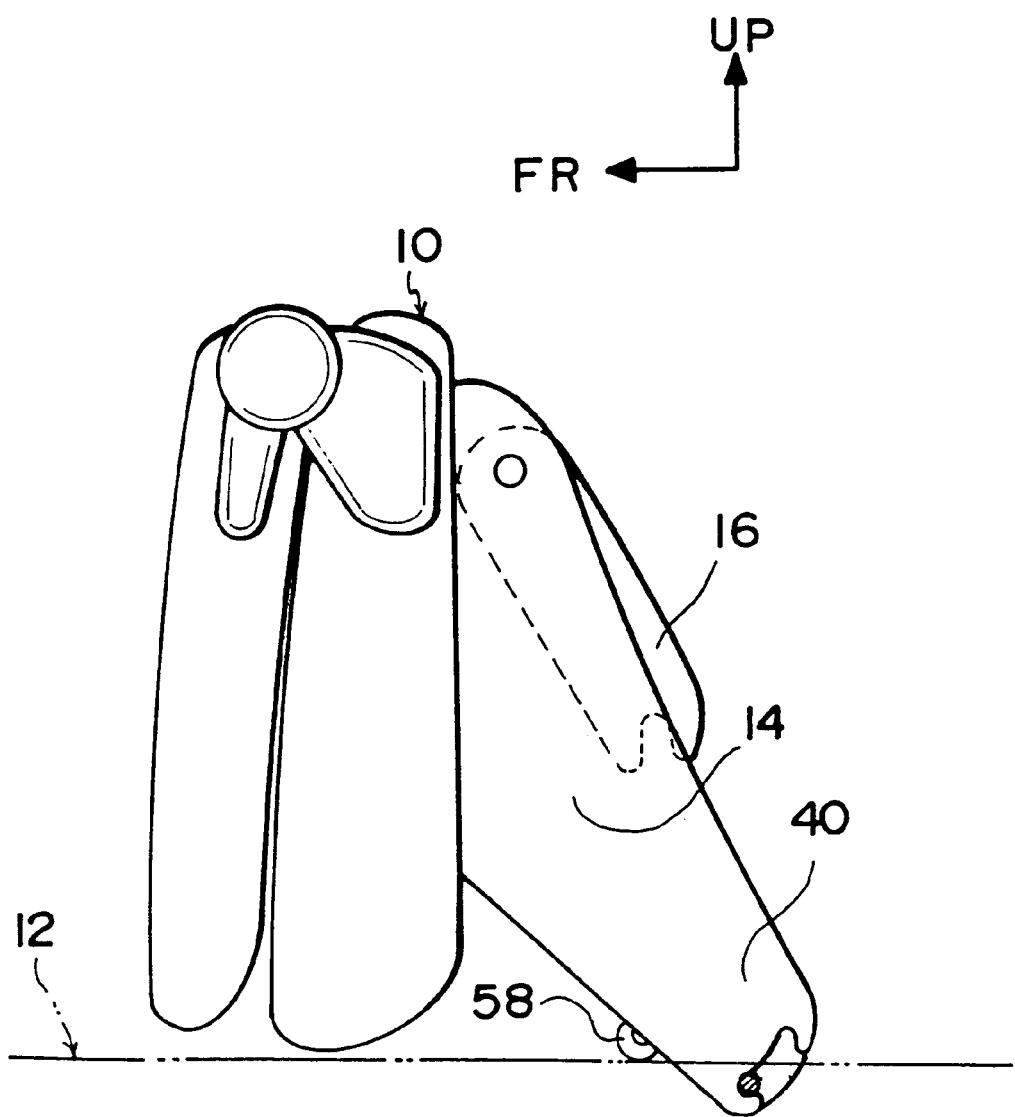
FIG. 9 is a side view illustrating the seat tumbled state of the seat structure for a vehicle in accordance with the first embodiment of the present invention.

As shown in FIG. 5, if the rear portion of the seat 10 is inclined forward in this engagement-canceled state, the bottom 42A of the notch 42 slides on the pin 36, and the front leg portion 40 is swung in the direction of arrow F. Consequently, the hook portion 40A of the front leg portion 40 passes underneath the pin 36 which has reached the bottom of the engaging groove 56 provided in the base hook 50, thereby setting the base hook 50 and each pin 36 in the locked state. Incidentally, in this locked state the seat 10 is held in a folded state, i.e., a so-called tumbled state, as shown in FIG. 9.

It should be noted that when the base hook 50 has swung backward together with the front leg portion 40 at the time of returning the seat 10 from the tumbled state (the state shown in FIGS. 5 and 9), the movable state (the state shown in FIGS. 4 and 8), and the attachable/detachable state (the state shown in FIG. 3) to the seat usable state (the state shown in FIGS. 2 and 7), the pin 53 abuts on the flange portion 12B of the rail 12, restricting the rotation of the base hook 50. Hence, the hook portion 40B of the front leg portion 40 passes underneath each pin 36 which has reached the bottom of the engaging groove 56 provided in the base hook 50, thereby setting the front leg portion 40 in the locked state.

Accordingly, with the seat structure for a vehicle in accordance with this embodiment, if the lever 20 of the lock mechanism 19 provided on the rear leg portion 16 is released, and then if the seat 10 is merely swung, the front leg portion 40 can be unlocked. As a result, since the elongated connecting rod extending in the back-and-forth direction of the seat as in conventional structures is not used, it is possible to reduce the weight of the seat and improve the operating efficiency in changing the position of the seat relative to the floor.

Next, referring to FIGS. 10 and 11, a description will be given of a second embodiment of the seat structure for a vehicle in accordance with the present invention. It should be noted that the same members as those of the first embodiment will be denoted by the same reference numerals, and that descriptions thereof will be omitted.

Figure 10:
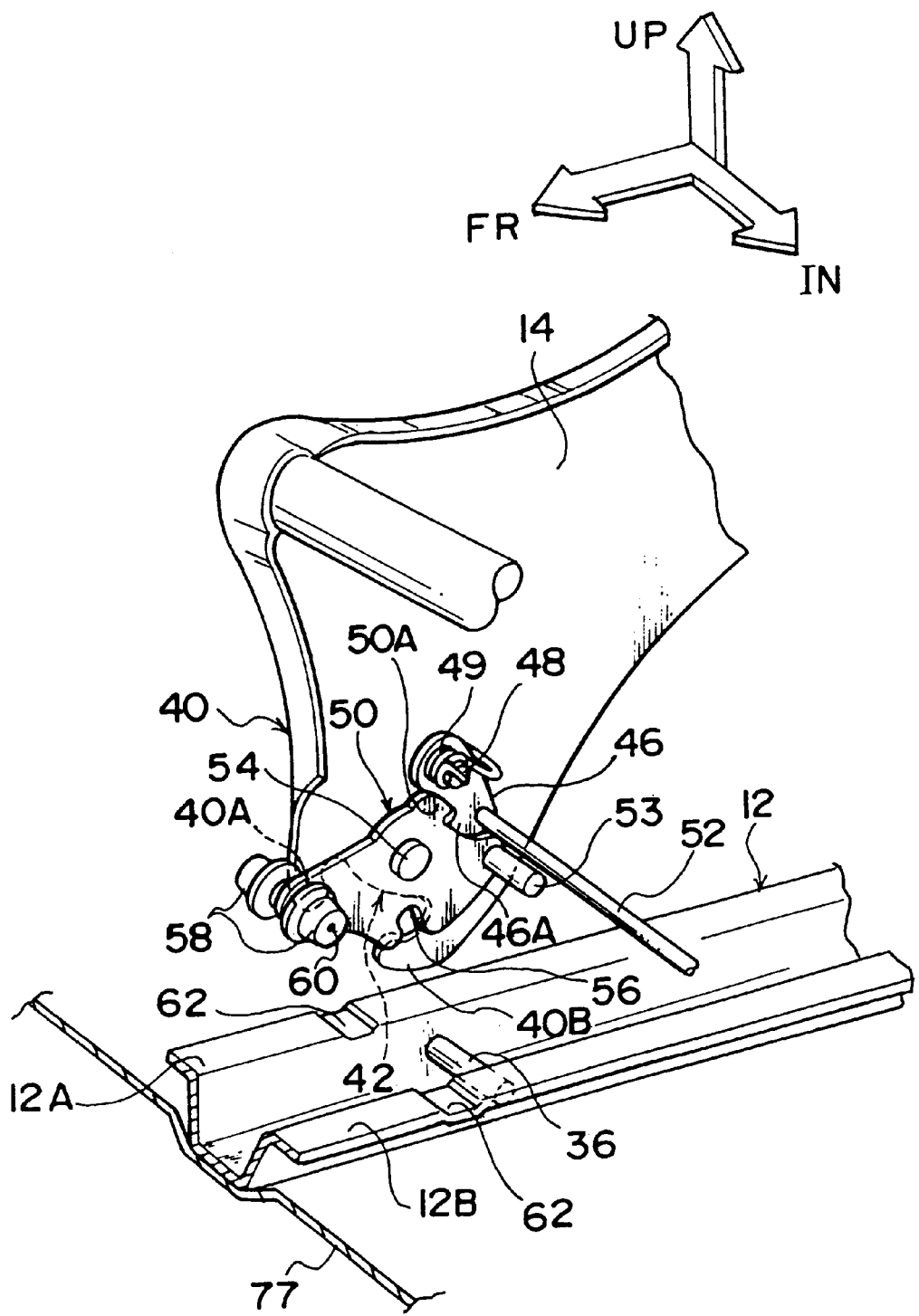
FIG. 10 is a perspective view taken from the forward inner side of the vehicle and illustrating essential portions of the seat structure for a vehicle in accordance with a second embodiment of the present invention.

As shown in FIG. 10, in this second embodiment, two rollers 58 serving as the moving means are supported by the shaft 60, and these rollers 58 are adapted to move on the flange portions 12A and 12B, respectively, which are provided at the opening of each rail 12.

Figure 11:
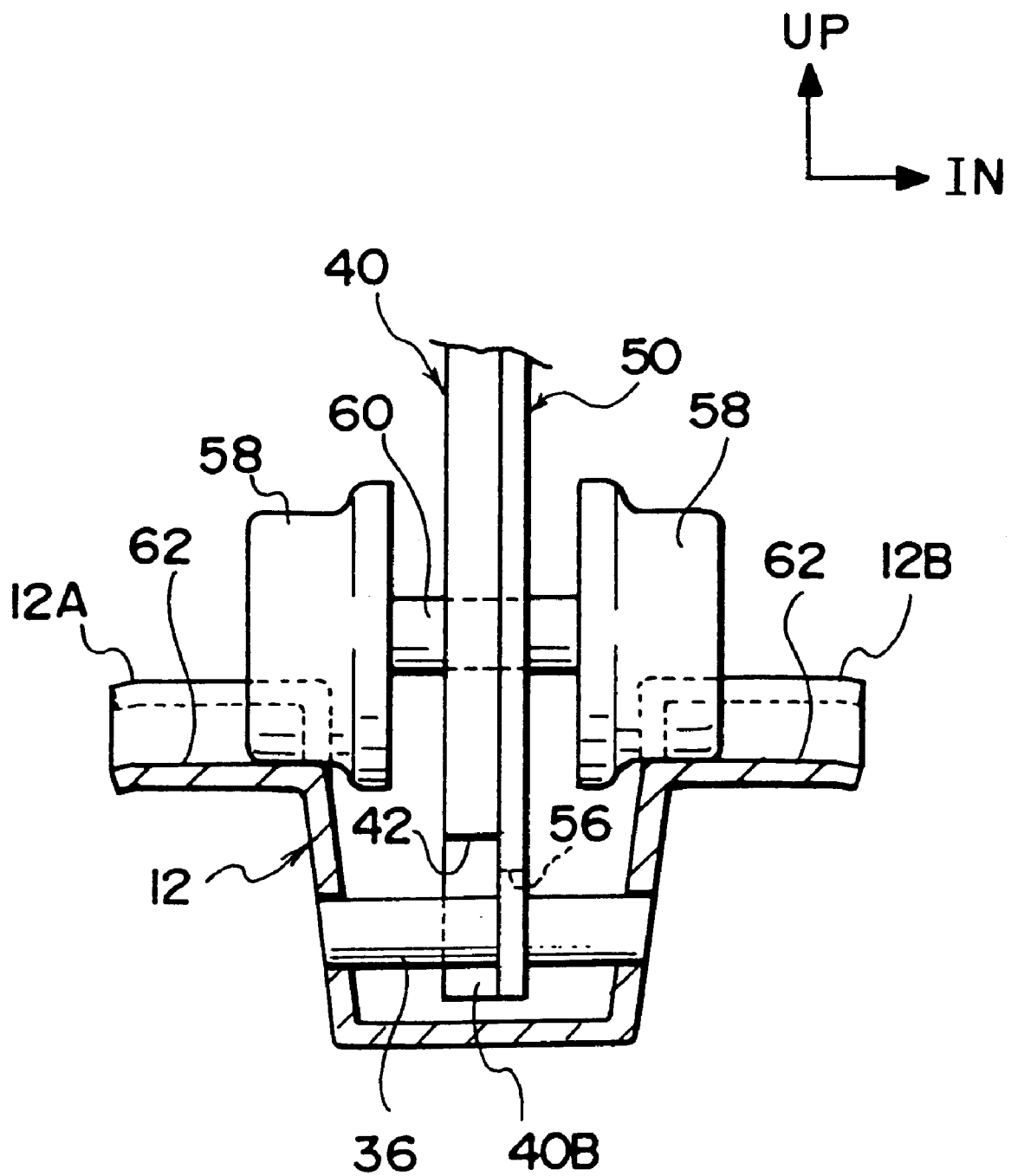
FIG. 11 is a cross-sectional view taken from the forward side of the vehicle and illustrating essential portions of the seat structure for a vehicle in accordance with the second embodiment of the present invention.

As shown in FIG. 11, a recessed portion 62 is formed on each of the flange portions 12A and 12B of the rail 12, and if the seat 10 is moved downward in the state in which the rollers 58 are accommodated in these recessed portions 62, the pins 36 are adapted to enter the engaging groove 56 in the base hook 50.

Accordingly, when the seat 10 is fixed in a predetermined position, positioning can be facilitated remarkably through provision of these recessed portions 62.

Next, referring to FIGS. 12 to 14, a description will be given of a third embodiment of the seat structure for a vehicle in accordance with the present invention. It should be noted that the same members as those of the first embodiment will be denoted by the same reference numerals, and that descriptions thereof will be omitted.

Figure 12:
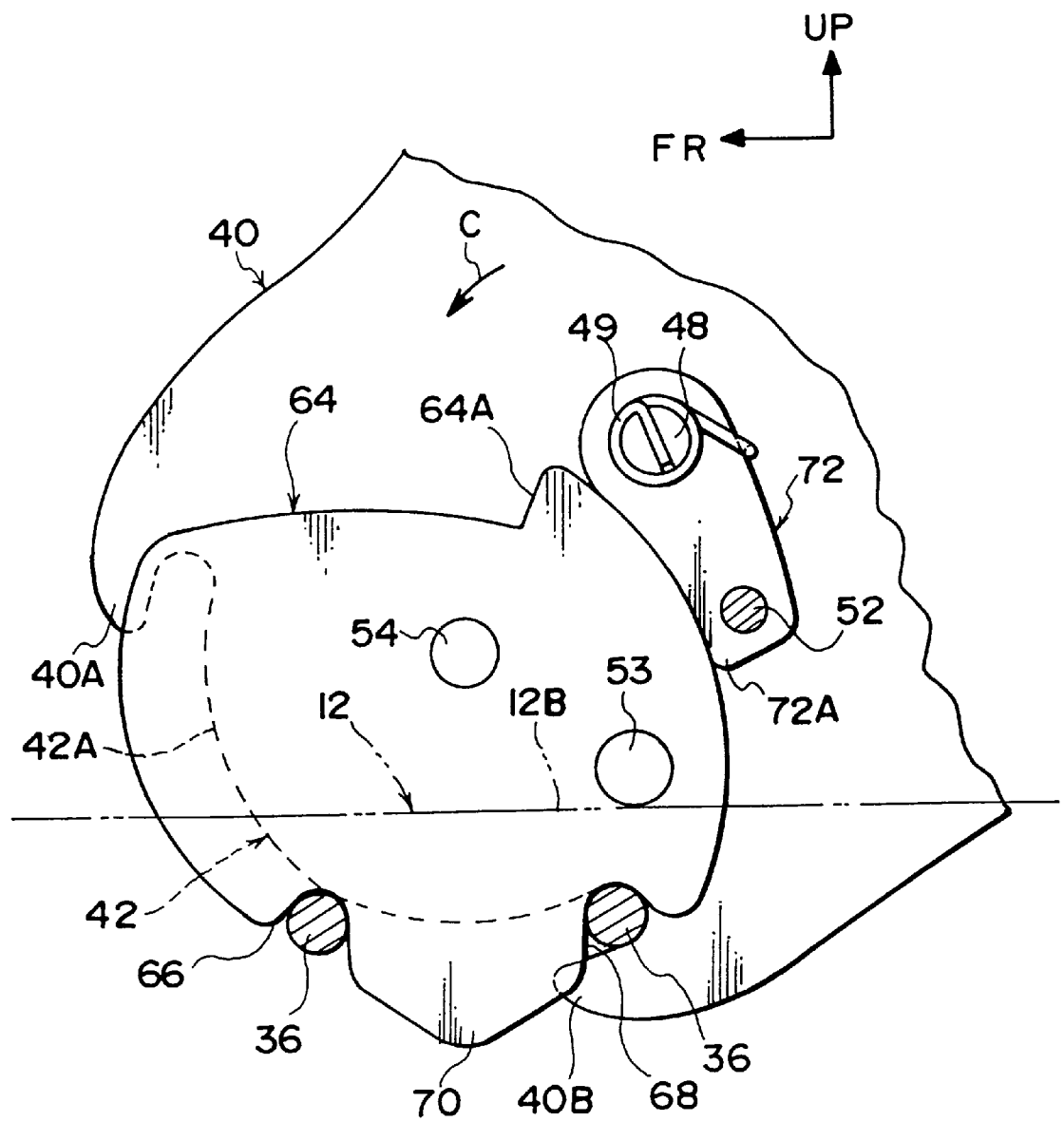
FIG. 12 is a side view illustrating the seat usable state of essential portions of the seat structure for a vehicle in accordance with a third embodiment of the present invention.

As shown in FIG. 12, in this embodiment, two U-shaped engaging grooves 66 and 68 are formed in a lower portion of a base hook 64, which serves as an engaging member, in such a manner as to be spaced apart a predetermined interval in the back-and-forth direction, both of these engaging grooves 66 and 68 being respectively adapted to engage with the pins 36 provided at the vehicle body side. A wall portion 64A formed by raising a seat rear-side of the base hook 64 is formed on an upper portion of the base hook 64. An end portion 72A of a cam 72, which serves as a swinging-motion restricting means connected swingably to the front leg portion 40 by means of the pin 48, is engageable with the wall portion 64A.

Next, a description will be given of an operation of this embodiment.

With the seat structure for a vehicle in accordance with the present embodiment, when the seat is in the usable state, i.e., when the seat cushion frame is in the state wherein an occupant can be seated, each rear leg portion 16 and pin 36 are held in the locked state by means of the lock mechanism 19. At the same time, as shown in FIG. 12, the pins 36 respectively abut on the bottoms of the two engaging grooves 66 and 68 provided in the base hook 50, and as the hook portion 40B of the front leg portion 40 has passed underneath the pin 36 which has reached the bottom of the rear-side engaging groove 68, the front leg portion 40 and the pins 36 are in the locked state.

Meanwhile, when the seat 10 is detached from the vehicle body, each lock mechanism 19 on the rear leg portion 16 is set in the unlocked state in the same way as in the first embodiment, and the rear portion of the seat 10 is pulled upward. At this time, the bottom of the notch 42 slides on the pins 36, and the front leg portion 40 is swung in the direction of arrow C. As a result, the rear-side pin 36 moves to the opening portion of the notch 42, and the hook portion 40B of the front leg portion 40 comes out from underneath the rear-side pin 36, so that the engagement between the engaging groove 68 provided in the base hook 64 and each pin 36 can be canceled.

Figure 13:
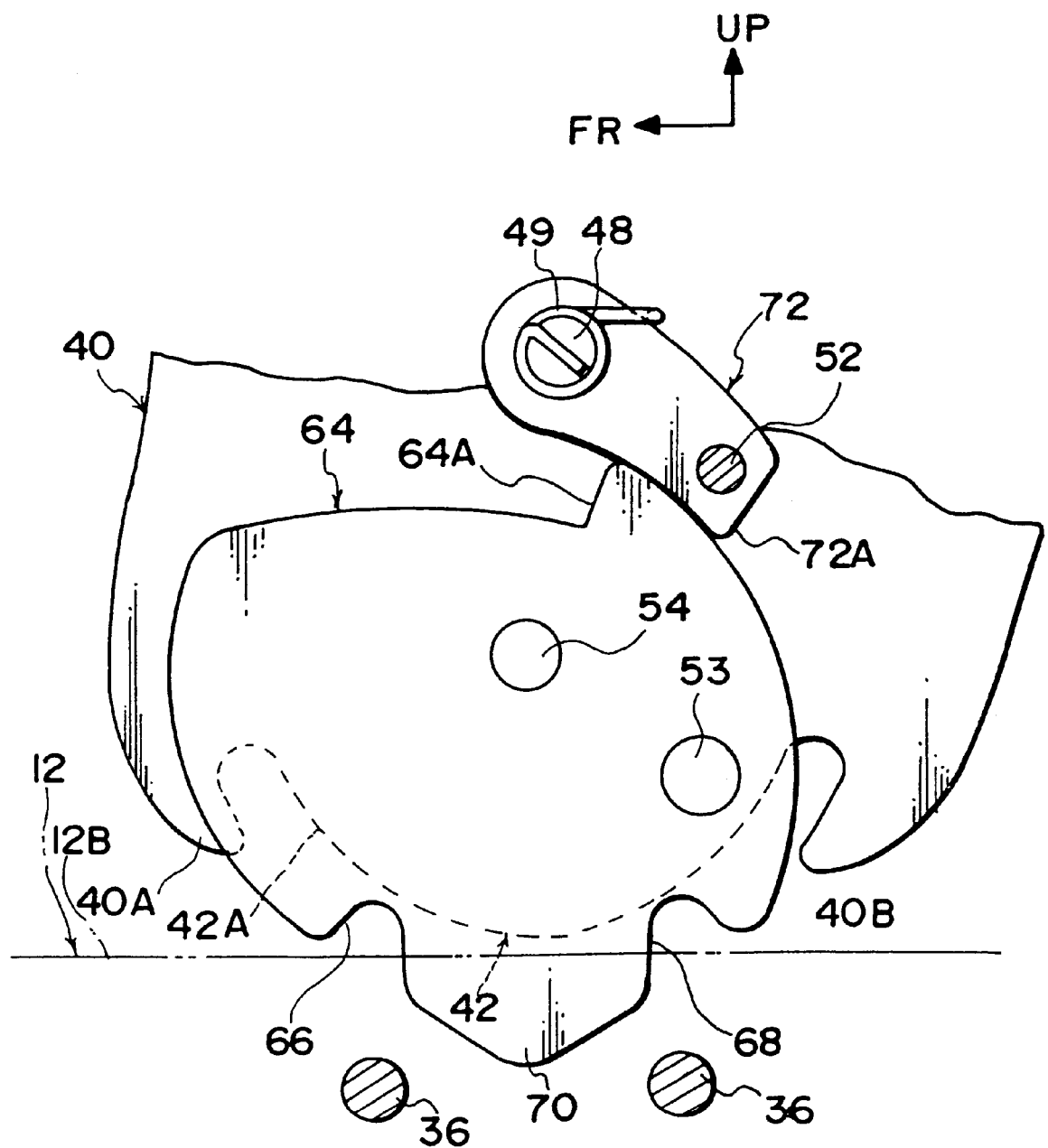
FIG. 13 is a side view illustrating the seat attachable/detachable state of the essential portions of the seat structure for a vehicle in accordance with the third embodiment of the present invention.

In this state, if the seat 10 is pulled upward, as shown in FIG. 13, the pins 36 come off the engaging grooves 66 and 68 provided in the base hook 64, and the engagement therebetween is canceled, allowing the seat 10 be detached from the vehicle body.

Figure 14:
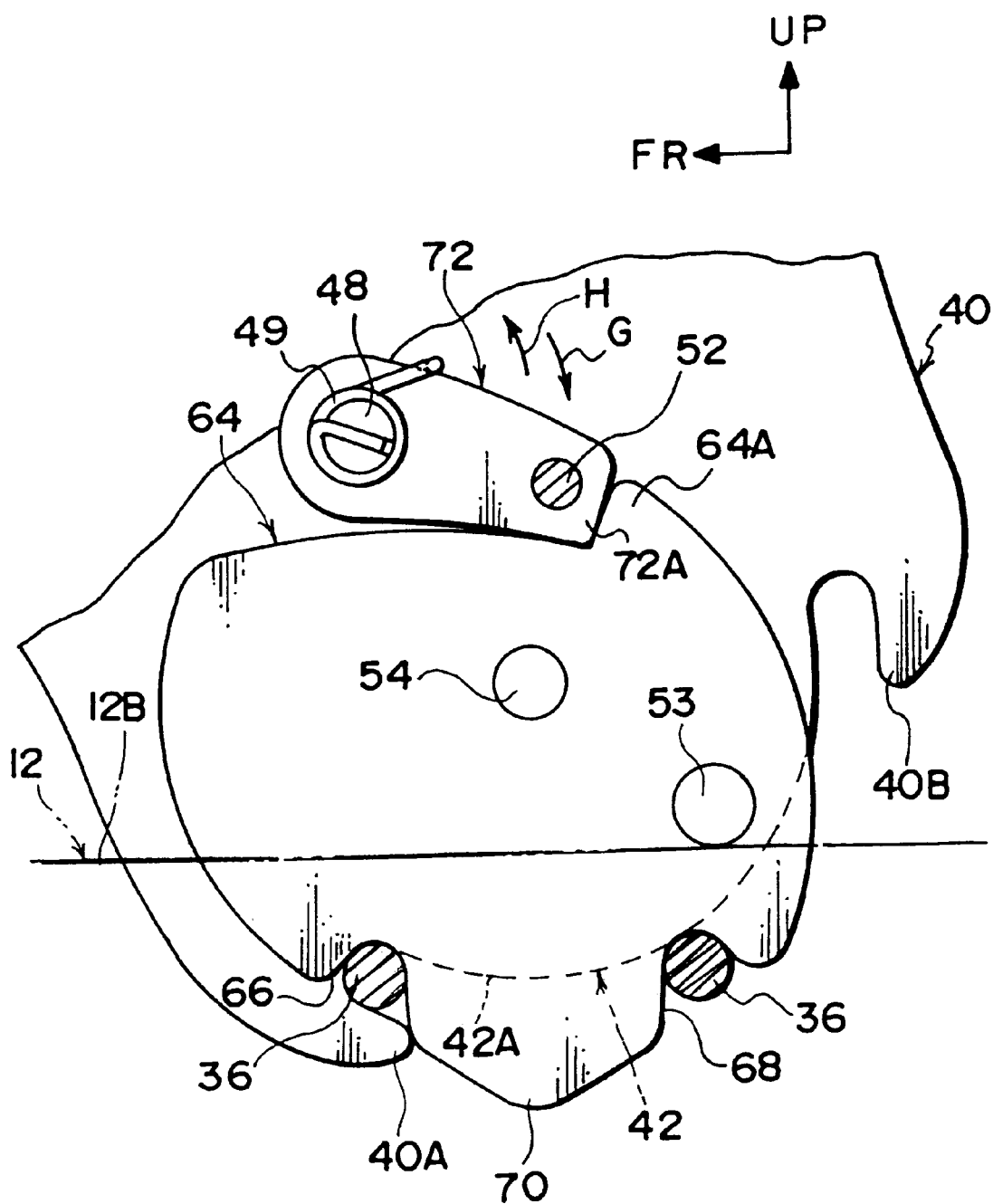
FIG. 14 is a side view illustrating the seat tumbled state of the essential portions of the seat structure for a vehicle in accordance with the third embodiment of the present invention.

Accordingly, in the state shown in FIG. 12, if the rear portion of the seat 10 is swung forward, as shown in FIG. 14, the hook portion 40A of the front leg portion 40 passes underneath each pin 36 which has reached the bottom of the front-side engaging groove 66 in the state in which the pins abut on the bottoms of both engaging grooves 66 and 68 provided in the base hook 64, thereby setting the front leg portion 40 and the pins 36 in the locked state.

Further, in this state, since the cam 72 is swung about the pin 48 in a substantially downward direction (in the direction of arrow G in FIG. 14) by the urging force of the spring 49, which in turn causes the end portion 72A of the cam 72 to engage with the wall portion 64A of the base hook 64, thereby restricting the swinging motion of the hook 64 and the front leg portion 40. Hence, the seat 10 is held in this tumbled state.

Incidentally, to cancel this tumbled state, it suffices if the lever 52 is operated to swing the cam 72 about the pin 48 in a substantially upward direction (in the direction of arrow H in FIG. 14) against the urging force of the spring 49, thereby canceling the engagement between the end portion 72A of the cam 72 and the wall portion 64A of the base hook 64.

Accordingly, with the seat structure for a vehicle in accordance with this embodiment as well, in the same way as in the first embodiment, since the elongated connecting rod extending along the back-and-forth direction of the seat is not used, it is possible to reduce the weight of the seat and improve the operating efficiency in changing the position of the seat relative to the floor.

Figure 15:
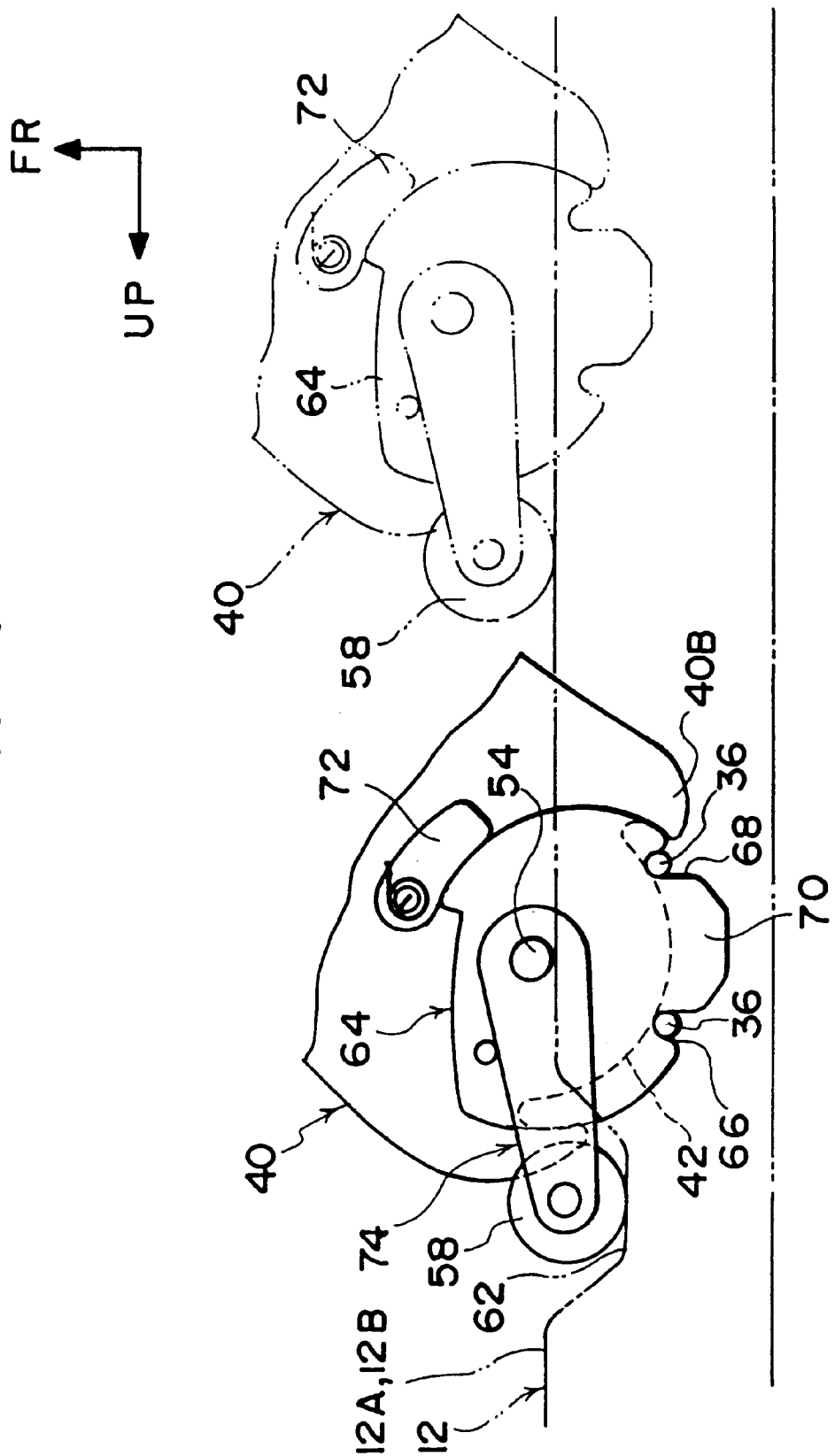
FIG. 15 is a side view illustrating essential portions of the seat structure for a vehicle in accordance with a modification of the third embodiment of the present invention.

Although, in the arrangement provided in this embodiment, the base hook 64 is not provided with the roller serving as the moving means, an arrangement may be provided such that, as shown in FIG. 15, in the same way as in the first embodiment the base hook 64 is provided with a roller unit 74 having the roller 58 serving as the moving means, such that when the seat 10 is moved, the roller 58 is adapted to move on the flange portion 12A, 12B of the rail 12, as indicated by the double-dashed chain line in FIG. 15.

Next, referring to FIGS. 16 to 19, a description will be given of a fourth embodiment of the seat structure for a vehicle in accordance with the present invention. It should be noted that the same members as those of the first embodiment will be denoted by the same reference numerals, and that descriptions thereof will be omitted.

Figure 17:
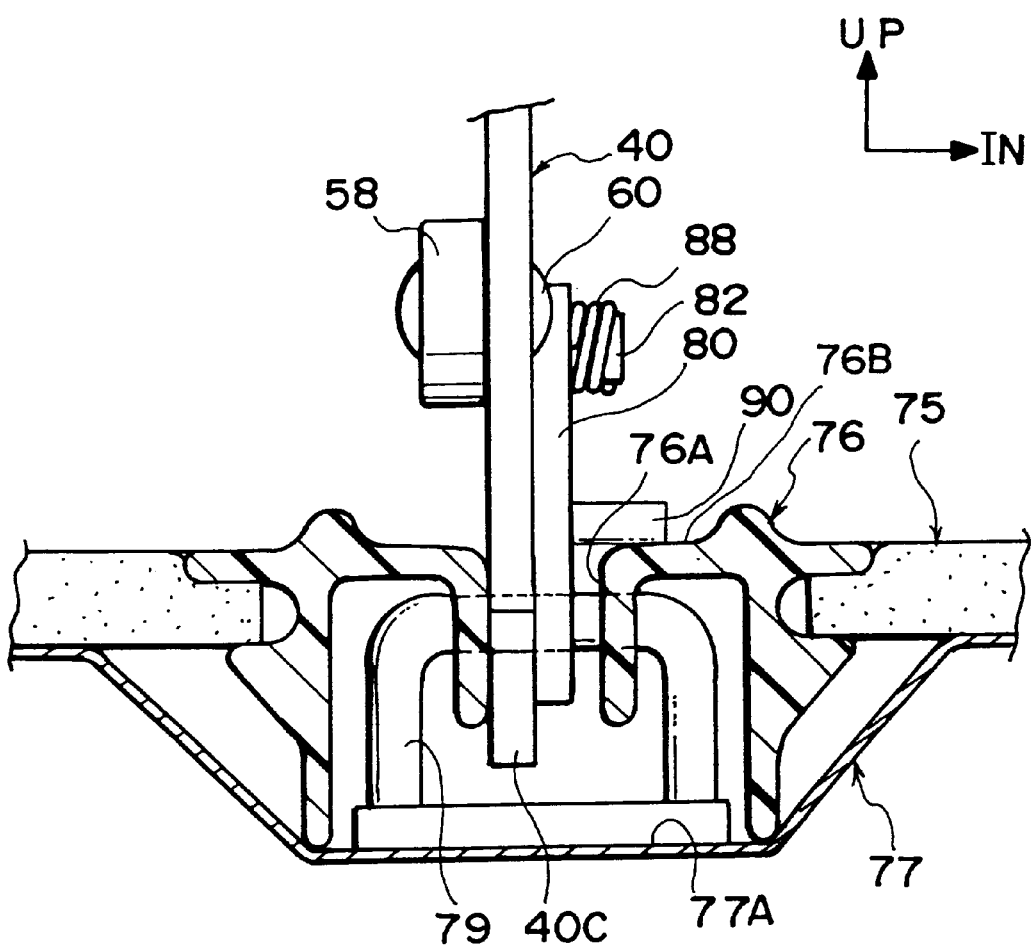
FIG. 17 is a cross-sectional view taken from the forward side of the vehicle and illustrating essential portions of the seat structure for a vehicle in accordance with the fourth embodiment of the present invention.

As shown in FIG. 17, in the present embodiment, a roller guide 76 is provided at a floor portion 75 of the vehicle body. This roller guide 76 is formed of a resin material, and is laid on a recessed portion 77A formed in a floor panel 77.

A striker 79 serving as a seat fixing member is disposed at the bottom of the recessed portion 77A of the floor panel 77, and a slit 76A is formed at a position of the roller guide 76 which opposes the striker 79.

Figure 19:
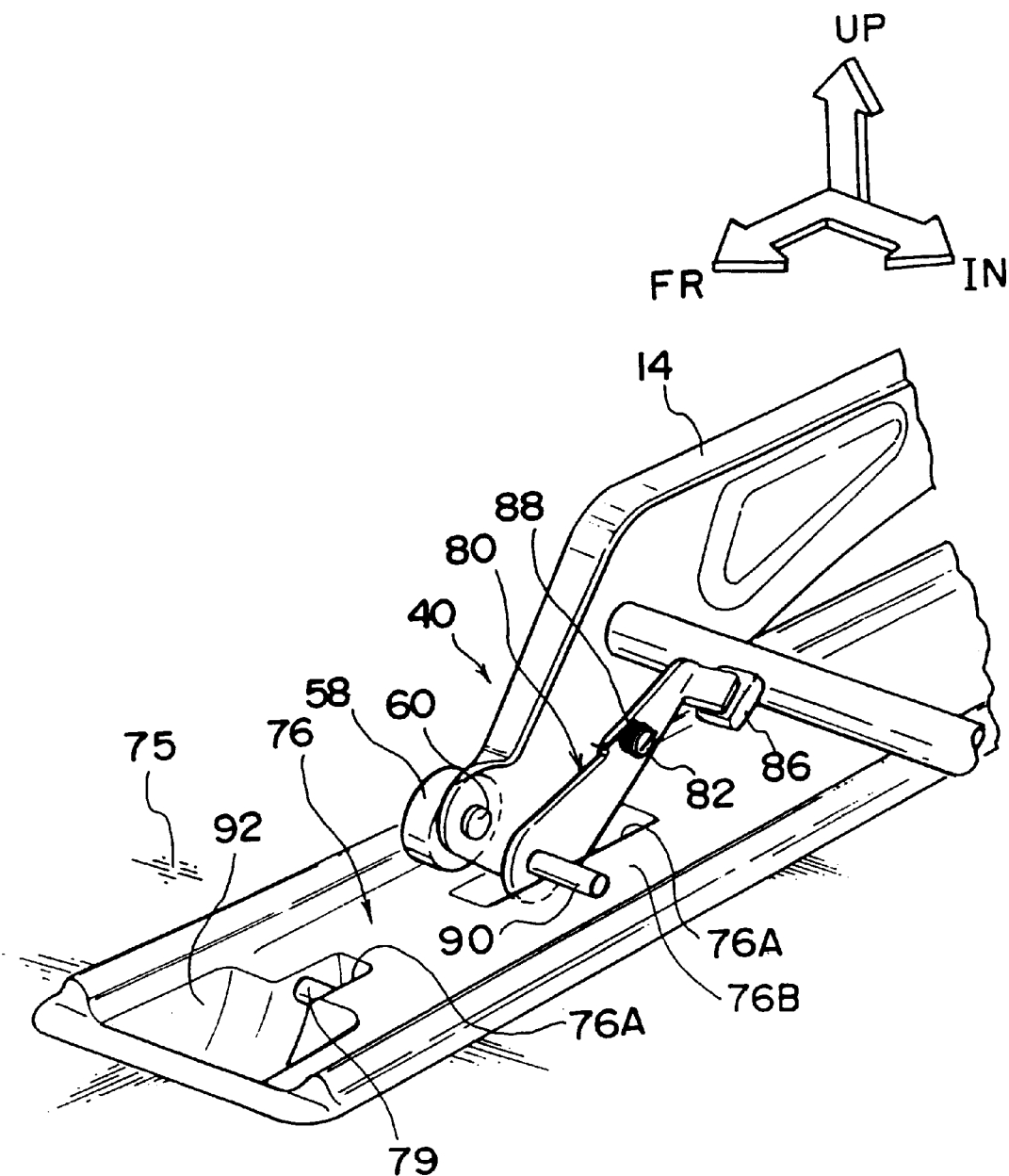
FIG. 19 is a perspective view taken from the forward inner side of the vehicle and illustrating the essential portions of the seat structure for a vehicle in accordance with the fourth embodiment of the present invention.
Figure 20:
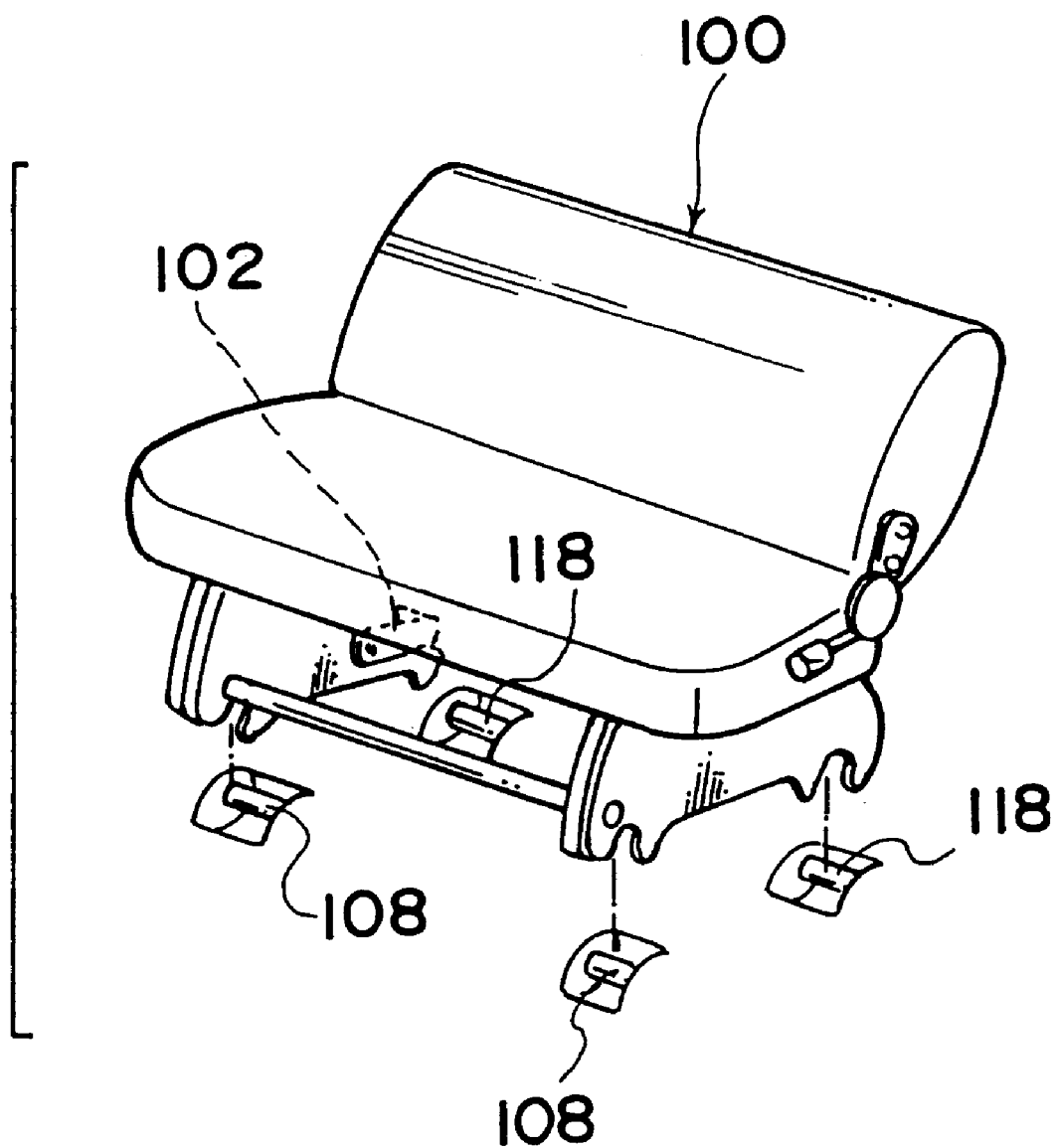
FIG. 20 is a perspective view taken from the diagonally forward side of the vehicle and illustrating a seat structure for a vehicle in accordance with the conventional art.
Figure 21:
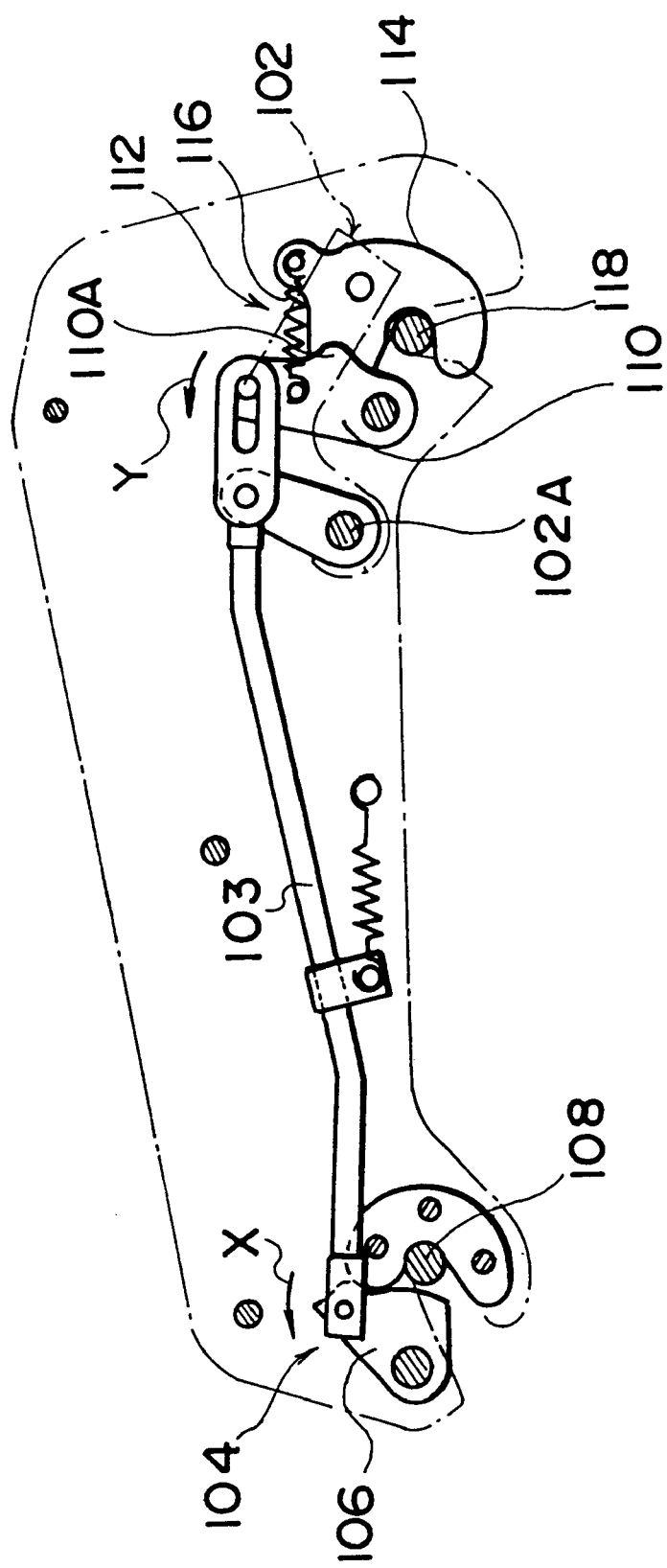
FIG. 21 is a side view illustrating the seat usable state of essential portions of the seat structure for a vehicle in accordance with the conventional art.

As shown in FIG. 19, a recessed portion 92 for holding the tumbled state is formed continuously in front of the slit 76A formed in a front end portion of the roller guide 76.

Figure 16:
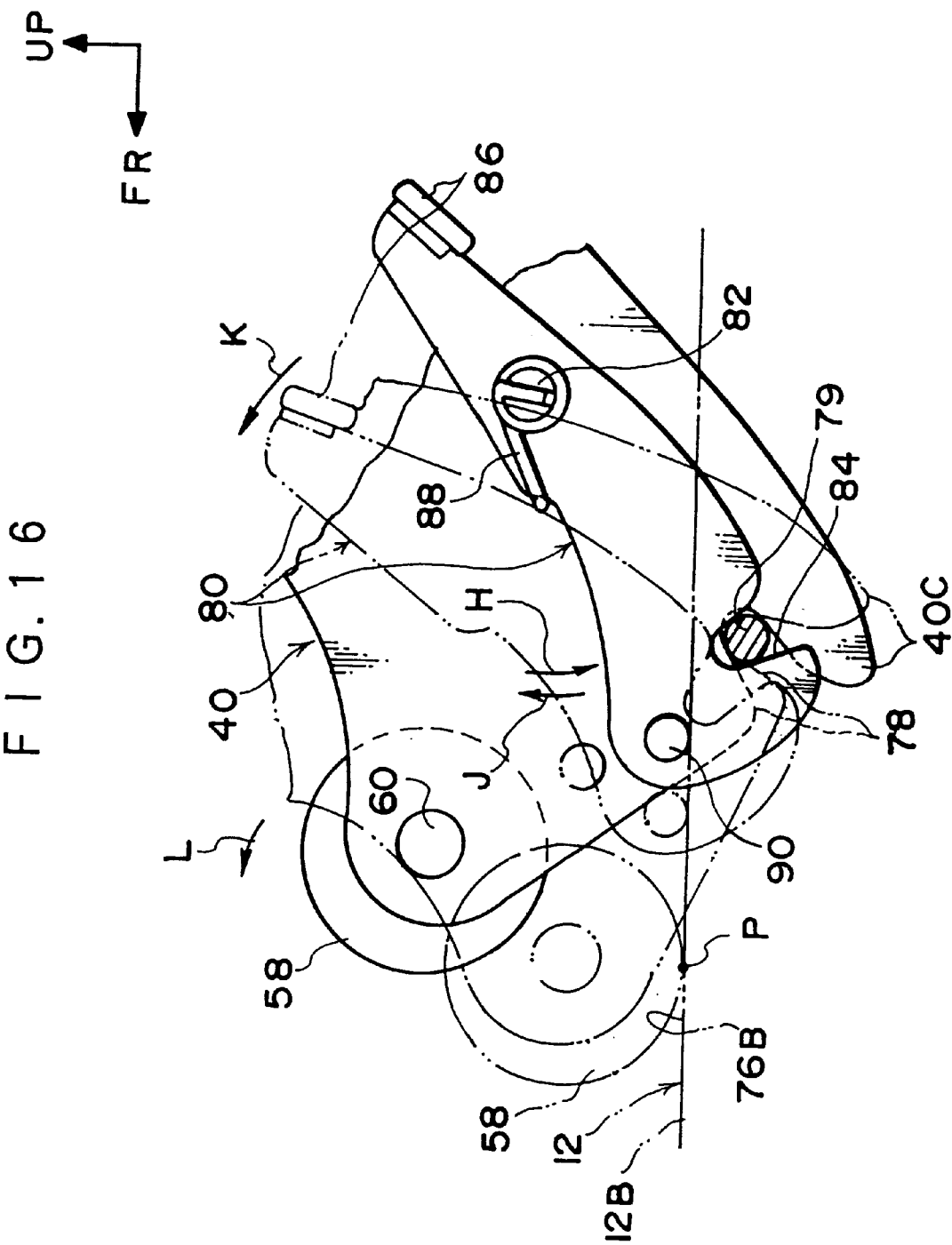
FIG. 16 is a side view illustrating the seat usable state of essential portions of the seat structure for a vehicle in accordance with a fourth embodiment of the present invention.

As shown in FIG. 16, in the present embodiment, a U-shaped notch 78 serving as a lock controlling portion is formed in a lower end portion of the front leg portion 40, and a lower side of the notch 78 is formed as the hook portion 40C. An intermediate portion of a lever 80 serving as an engaging member is swingably connected to the front leg portion 40 by means of a pin 82, and a U-shaped engaging groove 84 is formed in a lower front portion of the lever 80. Accordingly, as the hook portion 40C of the front leg portion 40 passes underneath the striker 79 inserted in the engaging groove 84 of the lever 80, the seat 10 is prevented from coming off the striker 79.

Further, an operation knob 86 is provided on a rear portion of the lever 80. A spring 88 wound around the pin 82 is engaged with the lever 80, and the spring 88 urges the lever 80 in a direction in which the striker 79 enters the engaging groove 84 (in the direction of arrow H in FIG. 16). Accordingly, by operating the operation knob 86, the lever 80 is swingable against the urging force of the spring 88 in the direction in which the striker 79 is disengaged from the engaging groove 84 (in the direction of arrow J in FIG. 16).

A pin 90 is provided in an upright position on an upper front portion of the lever 80 in such a manner as to extend in the inward direction of the seat, and the pin 90 abuts on an upper surface 76B of the roller guide 76.

Next, a description will be given of an operation in accordance with this embodiment.

In the present embodiment, in the same way as in the first embodiment, if the lock mechanism of each unillustrated rear leg portion is unlocked, and the rear portion of the seat is swung forward, each front leg portion 40 is swung about the striker 79 in the substantially forward direction (in the direction of arrow K in FIG. 16). At this time, since the pin 90 of the lever 80 abuts on the upper surface 76B of the roller guide 76, the swinging motion of the lever 80 is restricted. As a result, the lever 80 is swung about the pin 90 in the direction of arrow J in FIG. 16 with respect to the front leg portion 40, so that the hook portion 40C of the front leg 40 comes out from beneath the striker 79 inserted in the engaging groove 84 of the lever 80, as indicated by the double-dashed chain line in FIG. 16.

In this state, if the rear portion of the seat 10 is further swung forward, the roller 58 abuts on the roller guide 76, and the front leg portion 40 and the lever 80 are swung about the point of contact, P, between the roller 58 and the roller guide 76 in the substantially forward direction (in the direction of arrow L in FIG. 16). As a result, the striker 79 comes off the notch 78 of the front leg portion 40, and the engagement therebetween is canceled, thereby making it possible to remove the seat.

In addition, in this canceled state, if the seat 10 is moved in the back-and-forth direction, the roller 58 rolls on the roller guide 76, so that the seat 10 can be moved easily.

Figure 18:
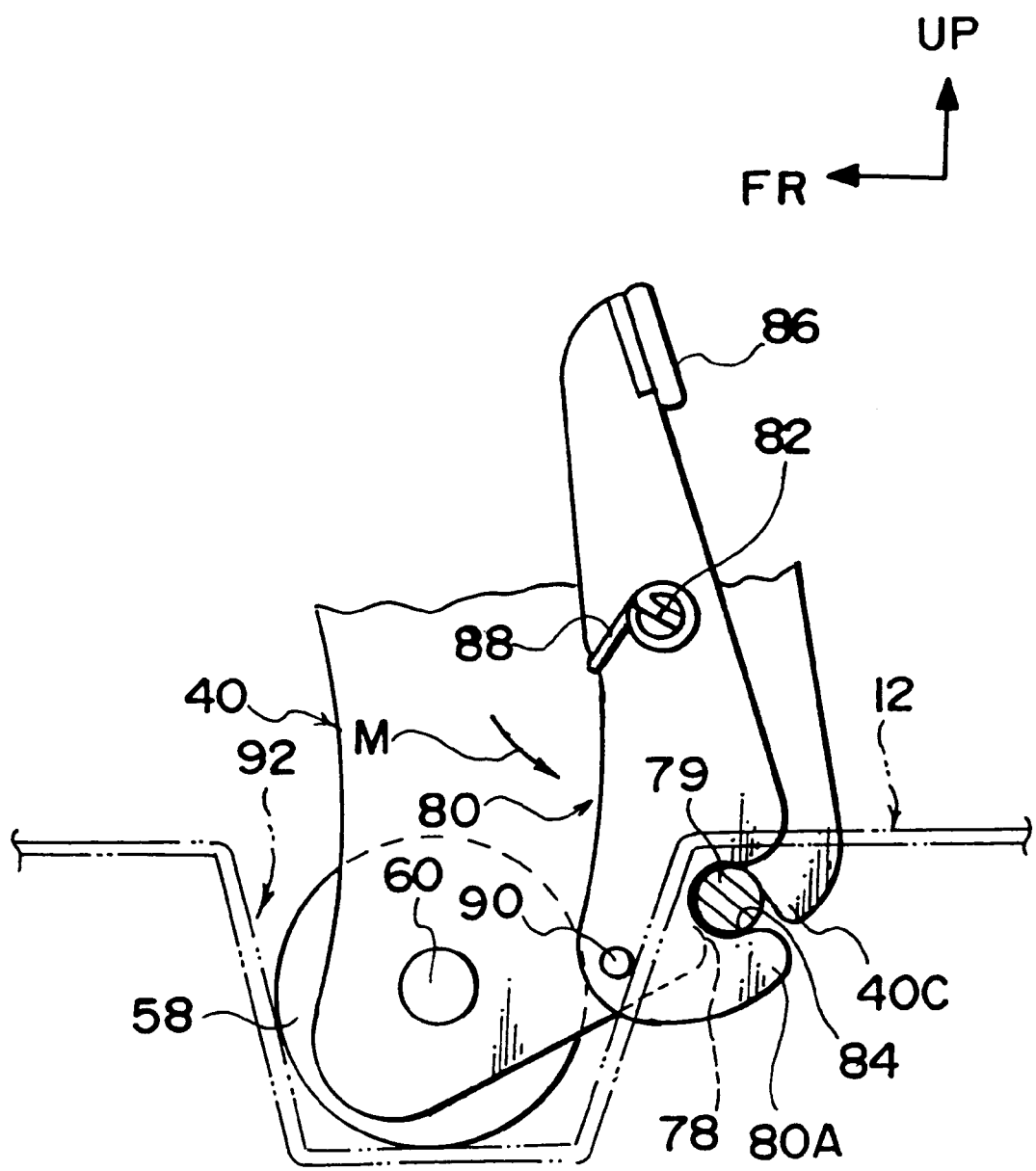
FIG. 18 is a side view illustrating the seat tumbled state of the essential portions of the seat structure for a vehicle in accordance with the fourth embodiment of the present invention.

Next, when the seat 10 is to be set in the tumbled state, the seat 10 is moved forward, and the roller 58 is allowed to drop into the recessed portion 92 for holding the tumbled state formed in the roller guide 76, as shown in FIG. 18. In this state, the front leg portion 40 moves downward, and the striker 79 engages the notch 78 of the front leg portion 40. In addition, since the pin 90 of the lever 80 also drops into the recessed portion 92 for holding the tumbled state, the lever 80 is swung in the substantially rearward direction (in the direction of arrow M in FIG. 18) with respect to the front leg portion 40, and a lower end portion 80A of the lever 80 passes underneath the striker 79 inserted in the notch 78 of the front leg portion 40 and is set in the locked state, thereby holding the seat 10 in this tumbled state.

Accordingly, with the seat structure for a vehicle in accordance with the present embodiment as well, in the same way as in the first embodiment, since the elongated connecting rod extending along the back-and-forth direction of the seat is not used, it is possible to reduce the weight of the seat and improve the operating efficiency in changing the position of the seat relative to the floor, i.e., the operating efficiency in changing the seat position to the slid state, the attachable/detachable state, and the tumbled state.

Although, a detailed description has been given above of specific embodiments of the present invention, the present invention is not limited to such embodiments, and it is apparent to those skilled in the art that various modifications are possible within the scope of the present invention. For example, although the roller 58 is used as the moving means in the above-described embodiments, other moving means such as a sliding member may be used instead of the roller 58. In addition, although the arrangement provided in the above-described embodiments is such that the seat 10 is detached by pulling the rear portion of the seat 10 upward, an arrangement may be alternatively provided such that the front and rear leg portions are interchanged and oriented in the longitudinally opposite directions, respectively, and the seat 10 is detached by pulling the front portion of the seat 10 upward.

What is claimed is:

1. A seat structure for a vehicle comprising:
   seat fixing members disposed at a vehicle body side;
   a lock mechanism disposed at one of a front side and a rear side of a lower portion of a seat and capable of selecting a locked state or an unlocked state with respect to said seat fixing members;
   a leg portion provided at another one of the front side and the rear side of the lower portion of the seat and swingable in a back-and-forth direction with respect to said seat fixing members;
   an engaging member swingably supported by said leg portion and having an engaging groove for engaging with said seat fixing members;
   a lock controlling portion formed in said leg portion and movable to a locking position in which said engaging member is set in a locked state with respect to said seat fixing member and an unlocking position in which said engaging member is set to an unlocked state such that said engaging member is detachable with respect to said seat fixing member as said leg portion swings; and
   swinging-motion restricting means swingably supported by said leg portion so as to restrict the swinging motion of said engaging member and said leg portion and for causing said engaging member to detach from said seat fixing member as said leg portion swings.

2. The seat structure for a vehicle according to claim 1, wherein said lock controlling portion is a notch extending in a circular arc-shape along a direction in which said leg portion swings, and a pair of hook portions for holding said seat fixing member in the locked state are respectively formed at opposite end portions of an opening portion of said notch.

3. The seat structure for a vehicle according to claim 1, further comprising:
   moving means which is provided at said leg portion and whose point of contact with the vehicle body serves as a center of the swinging motion of said leg portion when the swinging motion of said engaging member and said leg member is restricted by said swinging-motion restricting means, said moving means being used for moving the seat in a predetermined direction with respect to the vehicle body.

4. The seat structure for a vehicle according to claim 1, wherein said swinging-motion restricting means is a cam.

5. The seat structure for a vehicle according to claim 2, further comprising:
   moving means which is provided at said engaging member and whose point of contact with the vehicle body serves as a center of the swinging motion of said leg portion when the swinging motion of said engaging member and said leg member is restricted by said swinging-motion restricting means, said moving means being used for moving the seat in a predetermined direction with respect to the vehicle body.

6. The seat structure for a vehicle according to claim 2, wherein said lock controlling portion is arranged such that said hook portion, said engaging groove, and one of pins arranged within a rail in such a manner as to be spaced apart at predetermined intervals in a longitudinal direction of the vehicle and to be respectively oriented in a transverse direction of the vehicle engage with each other, the rail being laid on a floor of the vehicle body along the longitudinal direction of the vehicle.

7. The seat structure for a vehicle according to claim 2, wherein said swinging-motion restricting means is a cam.

8. The seat structure for a vehicle according to claim 5, wherein said moving means is a roller.

9. The seat structure for a vehicle according to claim 1, wherein said swinging-motion restricting means is a pin which is able to contact with a roller guide provided on a floor of the vehicle body.

10. The seat structure for a vehicle according to claim 6, further comprising:
    means for positioning in a longitudinal direction of a vehicle constituted by a recessed portion formed in a flange portion of said rail, said recessed portion allowing said hook portion, said engaging groove, and said pin to engage with each other therein.

11. The seat structure for a vehicle according to claim 6, wherein said lock mechanism includes a cam having an end portion pivotally supported by said leg portion and a ratchet which is pivotally supported by said leg portion and which is swingable in a substantially back-and-forth direction by being engaged with an engaging portion of said cam, said ratchet having a hook portion formed in a lower portion thereof, and the locked state being maintained by said hook portion formed in said leg portion and said pin.

12. The seat structure for a vehicle according to claim 6, wherein said engaging member has a plurality of engaging grooves.

13. The seat structure for a vehicle according to claim 10, wherein said means for positioning in a longitudinal direction of a vehicle is arranged such that said pin and said engaging groove engage with each other in a state in which a roller is fitted in said recessed portion.

14. The seat structure for a vehicle according to claim 11, wherein said lock mechanism moves to an unlocking position by means of a spring provided between said cam and said ratchet.

15. The seat structure for a vehicle according to claim 12, wherein said lock controlling means is arranged such that engagement by said pin, said hook portion formed in said leg portion, and said engaging grooves takes place in a plurality of positions.

16. The seat structure for a vehicle according to claim 3, wherein said moving means is a roller.

17. The seat structure for a vehicle according to claim 3, wherein said swinging-motion restricting means is a cam.

18. The seat structure for a vehicle according to claim 16, wherein said swinging-motion restricting means is a pin which is able to contact with a roller guide provided on a floor of the vehicle body.

19. The seat structure for a vehicle according to claim 18, wherein said seat fixing member is a striker provided in a first recessed portion formed in a floor of the vehicle body.

20. The seat structure for a vehicle according to claim 19, wherein a tumbled state in which said seat is folded is maintained by a second recessed portion formed in a floor panel of the vehicle body apart from said first recessed portion.

* * * * *

UNITED STATES PATENT AND TRADEMARK OFFICE
CERTIFICATE OF CORRECTION

PATENT NO. : 6,164,712
DATED : December 26, 2000
INVENTOR(S) : Satoshi Ajisaka

It is certified that error appears in the above-identified patent and that said Letters Patent is hereby corrected as shown below:

Item [73] is corrected to read as follows:

[73] Assignee: Aisin Seiki Kabushiki, Kaisha Kariya, Japan

Signed and Sealed this

Sixth Day of November, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,164,712
DATED         : December 26, 2000
INVENTOR(S)   : Satoshi Ajisaka It is certified that error appears in the above-identified patent and that said Letters Patent is hereby corrected as shown below:

Item [73] is corrected to read as follows:

[73]    Assignee: Aisin Seiki Kabushiki Kaisha, Kariya, Japan

This certificate supersedes Certificate of Correction issued November 6, 2001.

Signed and Sealed this

Fourth Day of June, 2002

*Attest:*

JAMES E. ROGAN
*Attesting Officer*    *Director of the United States Patent and Trademark Office*